US012213635B2

(12) United States Patent
Spinaccè

(10) Patent No.: US 12,213,635 B2
(45) Date of Patent: Feb. 4, 2025

(54) UTENSIL FOR COLLECTING AND POURING SOLID OR LIQUID PRODUCTS

(71) Applicant: Emanuela Spinaccè, Polcenigo (IT)

(72) Inventor: Emanuela Spinaccè, Polcenigo (IT)

( * ) Notice: Subject to any disclaimer, the term of this patent is extended or adjusted under 35 U.S.C. 154(b) by 445 days.

(21) Appl. No.: 17/761,834

(22) PCT Filed: Jul. 17, 2020

(86) PCT No.: PCT/IB2020/056728
§ 371 (c)(1),
(2) Date: Mar. 18, 2022

(87) PCT Pub. No.: WO2021/069978
PCT Pub. Date: Apr. 15, 2021

(65) Prior Publication Data

US 2022/0322910 A1 Oct. 13, 2022

(30) Foreign Application Priority Data

Oct. 10, 2019 (IT) ........................ 202019000003584
Jan. 17, 2020 (IT) ........................ 202020000000199

(51) Int. Cl.

| | |
|---|---|
| ***A47L 13/52*** | (2006.01) |
| ***A46B 9/00*** | (2006.01) |
| ***A46B 15/00*** | (2006.01) |
| ***B67C 11/00*** | (2006.01) |

(52) U.S. Cl.
CPC .............. *A47L 13/52* (2013.01); *A46B 9/005* (2013.01); *A46B 15/0095* (2013.01); *B67C 11/00* (2013.01)

(58) Field of Classification Search
CPC ........................................................ A47L 13/52
See application file for complete search history.

(56) References Cited

U.S. PATENT DOCUMENTS 6,102,278 A 8/2000 Rothas
2018/0078882 A1* 3/2018 Salani .................. B01D 29/085

FOREIGN PATENT DOCUMENTS

GB 946533 A 1/1964
JP 2005-288133 A 10/2005

OTHER PUBLICATIONS

Dec. 14, 2020 International Search Report issued in International Patent Application No. PCT/IB2020/056728.
Dec. 14, 2020 Written Opinion issued in International Patent Application No. PCT/IB2020/056728.

* cited by examiner

*Primary Examiner* — Andrew A Horton
(74) *Attorney, Agent, or Firm* — Oliff PLC

(57) ABSTRACT

A utensil for collecting and pouring solid or liquid products, and in particular to a utensil adapted both for collecting and pouring solid products in powder or granular form, and for collecting and pouring liquid products.

18 Claims, 27 Drawing Sheets

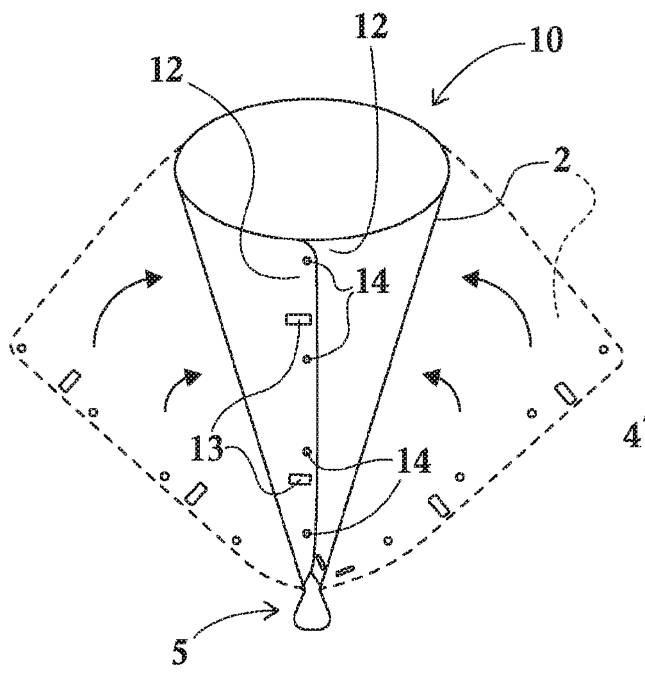
FIG. 2
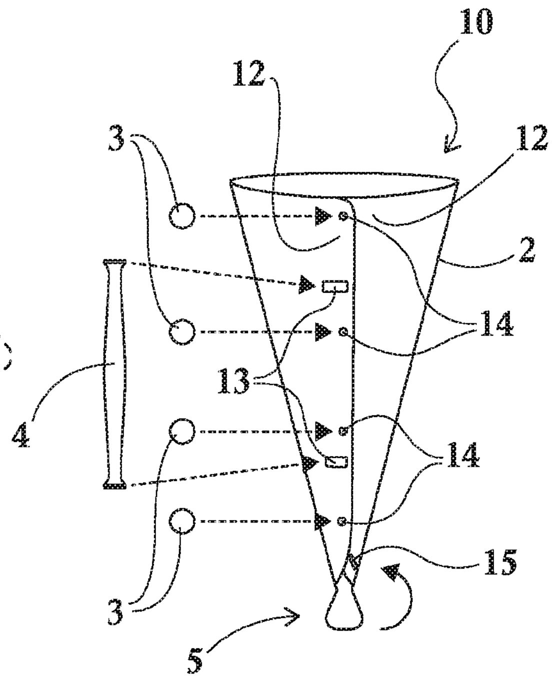
FIG. 3
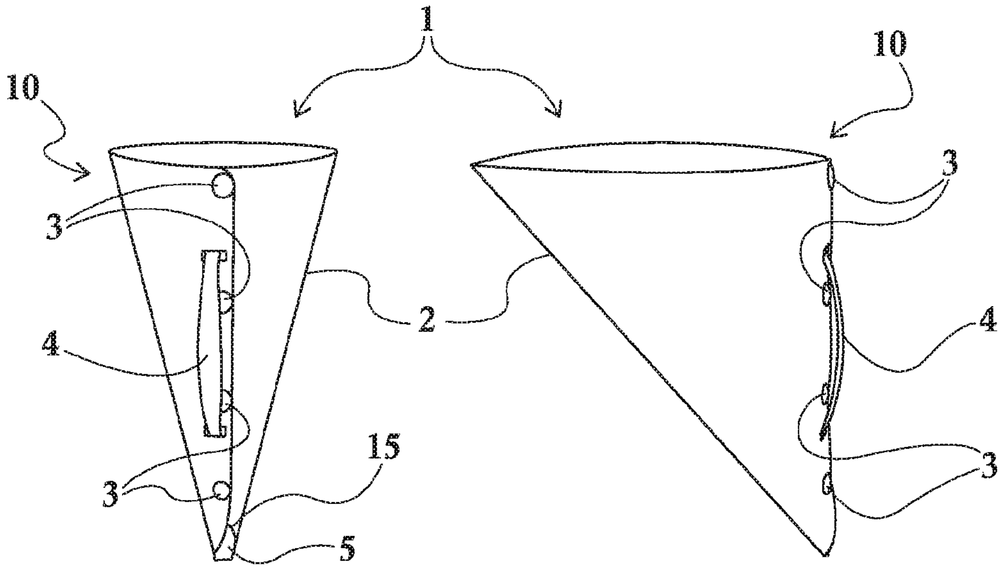
FIG. 4
FIG. 5

UTENSIL FOR COLLECTING AND POURING SOLID OR LIQUID PRODUCTS

TECHNICAL FIELD OF INVENTION

The present invention is relative to a utensil for collecting and pouring solid or liquid products, and in particular a constructively simple, practical and very versatile utensils adapted both for collecting and pouring solid products in powder or granular form, and for collecting and pouring liquids.

PRIOR ART

Various utensils are available on the market for collecting for example bits of food products or processing waste in general. These utensils are common scoops provided with a collecting brush in which the scoop consists of a handle integral with a collecting portion having a flat bottom and lateral holding walls, the front edge also being tapered to make the collection of the material easier.

A utensil of this kind is represented by a bailing scoop that also consists of a handle integral with a collecting portion in the shape of an elongate bowl, like a large spoon. The scoop is generally used to transfer powders, flours, grains or more generally products in granular form, but also various types of liquids, from one container to another.

There is also a particular product consisting of a sheet of leather folded upon itself and sewn in the shape of a hollow cone opened at the base. Externally, it is equipped with a handle. This utensil is sold as a scoop for charging pellets into stoves or as a holder for candies, chocolates or sweets in general.

All the above-mentioned utensils are used widely and generally appreciated in the market. However, they have some drawbacks that are also connected to their limited practicality, handiness and versatility. In addition, they are sometimes constructively somewhat complex, costly and burdensome.

SUMMARY OF INVENTION

The technical problem at the basis of the present invention is therefore to provide a utensil for collecting and pouring solid or liquid products that is ergonomic, practical, versatile, easy to use, compact and economic to make.

This problem is solved by a utensil for collecting and pouring solid or liquid products, provided with a very simple but practical and handy structure that allows its easy installation and removal, and that is not cumbersome to remove or to carry.

A first objective of the present invention is therefore a utensil for collecting and pouring solid products, that is easy to assemble because it is provided with a small number of practical and easily assembled elements.

A second objective is a utensil provided with a modifiable structure that can be quickly adapted to collecting and pouring solid and liquid products.

A third objective is a utensil having a particular shape that is easily used as a scoop for collecting solid products.

A further objective is a utensil comprising a support and a packaging conceived so as to make it suitable for accessory functions.

BRIEF DESCRIPTION OF THE FIGURES

Additional characteristics and the advantages of the utensil according to the present invention will become more evident from the following description of some embodiments given purely by way of a non-limitative example with reference to the following figures, wherein.

FIGS. 2 and 3 are each a schematic axonometric view of two moments in the assembling of the utensil of FIG. 1;

FIGS. 4 and 5 are each a schematic perspective view from two different sides of the assembled utensil of FIG. 1;

DETAILED DESCRIPTION OF THE INVENTION

Figure 1:
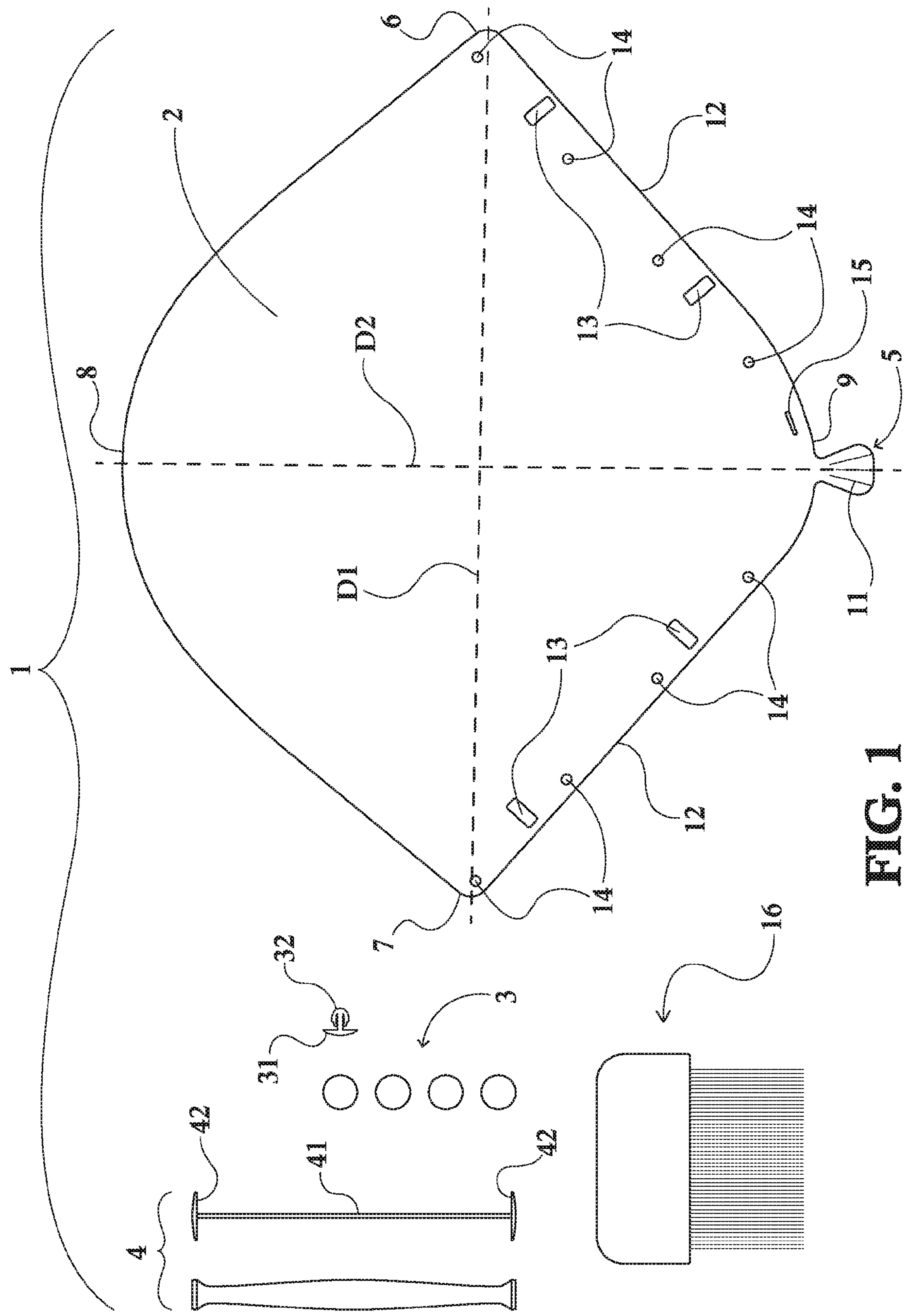
FIG. 1 illustrates a schematic plan view of the exploded-view drawing of the utensil of the present invention, according to a first embodiment.

With reference to FIGS. 1 to 5, reference numeral 1 indicates the generality of the exploded-view drawing of a utensil for collecting and pouring solid or liquid products according to the present invention.

The utensil 1 (FIG. 4) comprises a main body 10 in the shape of a hollow cone formed by the closing upon itself of a sheet of foldable material 2 along two adjoining edges, means 3 for reversibly joining said two edges, grasping means 4 for handling said utensil, means 5 for reversibly closing the vertex of the main body.

In particular, the sheet 2 (FIG. 1) has generally a diamond shape in a top view with four vertexes, a first vertex 6 opposite a second vertex 7 along a larger diameter D1, a third vertex 8 opposite a fourth vertex 9 along a smaller diameter D2. Preferably, each of said first 6 and second 7 vertices is rounded and acute.

The third 8 and fourth vertex 9 are instead preferably with an obtuse or rounded angle. In particular, the curve of the third vertex extends further with respect to the curve of the fourth vertex. Preferably, from the fourth vertex 9 extends an appendage 5 that forms the above-mentioned reversible closing means of the vertex of the main body 10, when the sheet 2 is folded as shown in FIGS. 2 to 5. In addition, the appendage 5 can be provided with notches 11 that facilitate bending to make it easier to close said vertex.

Advantageously, along two edges 12 of the sheet that branch off from the fourth vertex 9 are formed openings 13 for reversibly engaging the above-mentioned grasping means 4. Preferably, there are two openings 13 for each one of said edges 12.

In addition, along each of said two edges 12, there is also a plurality of holes 14 adapted to be reversibly engaged by corresponding buttons 3, as will be explained later. The buttons 3 represent the above-mentioned reversible joining means of the edges 12.

Preferably, also, a slit 15 is made near the fourth vertex 9 near the appendage 5 to allow the engagement with the same upon closing said vertex of the cone, as will be described below.

The reversible joining means 3 of said two edges 12 of the sheet 2, as already mentioned, will preferably consist of buttons having generally a mushroom shape with a disk-shaped head 31 and a rounded stem 32 for engagement with the holes 14 of said edges 12.

The grasping means 4 of the utensil 1 preferably consist of a handle comprising a flat and elongate portion 41 from the ends of which branch off tabs 42 that engage the openings 13 of said edges 12.

The utensil 1 of the present invention can also be provided with a conventional brush 16 for collecting dust, crumbs or other granular solid material.

As shown by the arrows of FIG. 2, the sheet 2 is folded upon itself so as to superimpose the two edges 12 so that both the holes 14 and the openings 13 of each edge coincide with each other.

In this position, the main hollow-cone body 10 of the utensil 1 is formed as shown in FIG. 3. It is thus possible to lock the body 10 in position thanks to the insertion of the buttons 3 in the respective holes 14 of both edges 12. The handle 4 can also be fastened to the body 10 by inserting the tabs 42 into the openings 13 of both edges 12.

Finally, the appendage 5 is folded upon itself, as shown by the arrow of FIG. 3, to close the vertex of the cone of the body 10 and it is kept in position thanks to the engagement of the appendage with the slit 15, while instead the base of the cone remains open.

The utensil 1 in accordance with the present invention is now ready for use (FIGS. 4, 5).

Figure 6:
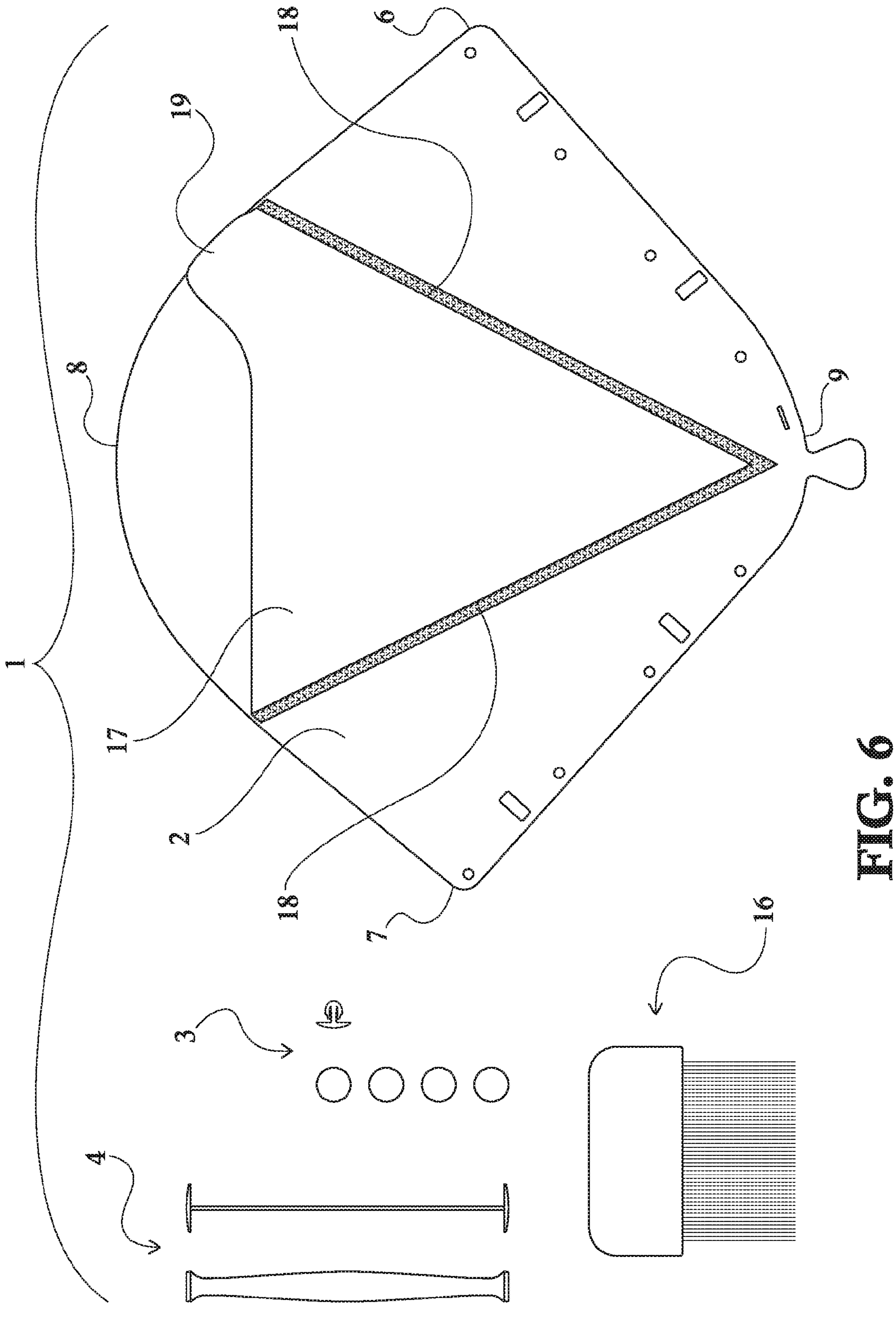
FIG. 6 illustrates a schematic plan view of the exploded-view drawing of the utensil of the present invention, according to a second embodiment.

In accordance with a first variant embodiment, the utensil 1 (FIG. 6) can advantageously comprise a partial lining 17 of the sheet 2. In particular, the lining is provided with at least one edge 18 anchored to the surface of the sheet and, preferably, a gripping tab 19 to rotate the lining to the operative position. Preferably the anchoring edges 18 are two in number and extend from the third vertex 8 of the sheet 2 to converge near the fourth vertex 9, so as to form a sort of triangle.

Figure 9:
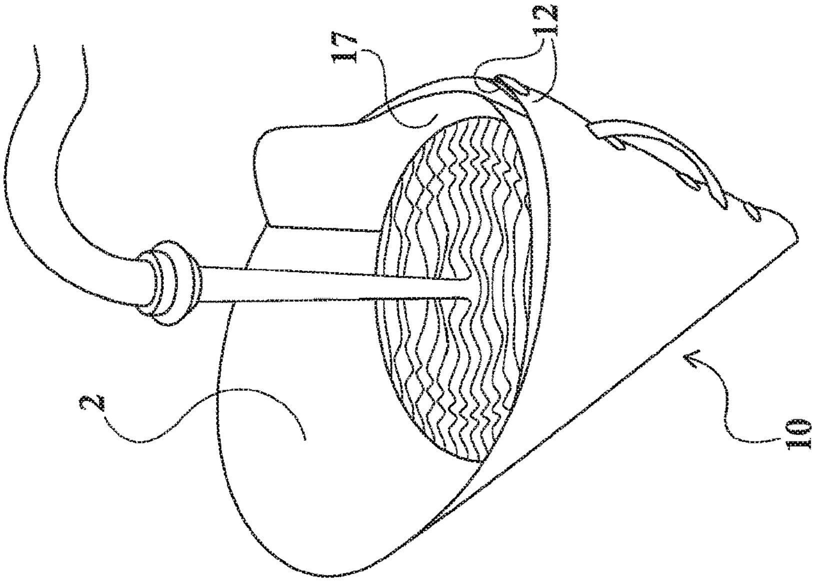
FIGS. 7 to 9 illustrate three perspective views of the assembled utensil of FIG. 6 in two operative conditions.
Figure 8:
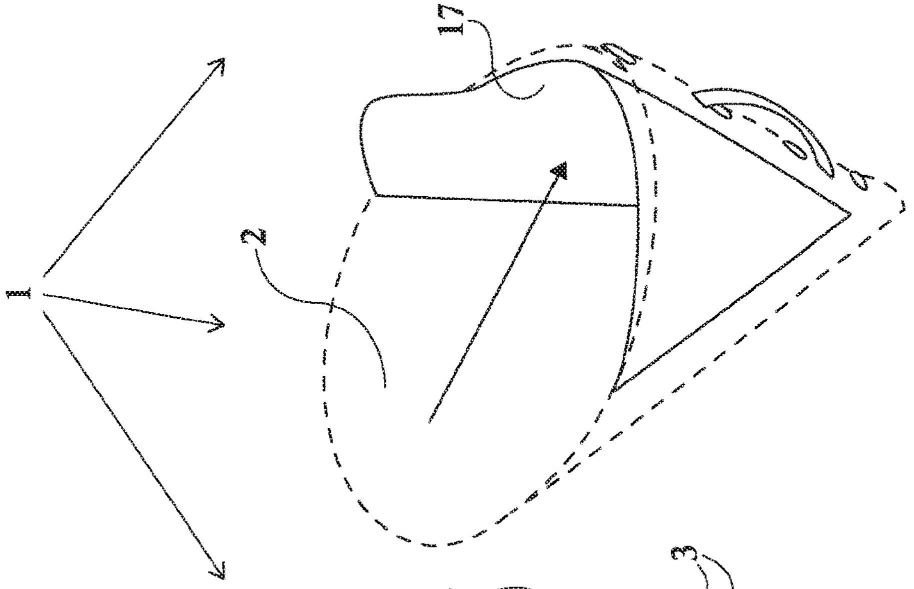
Figure 7:
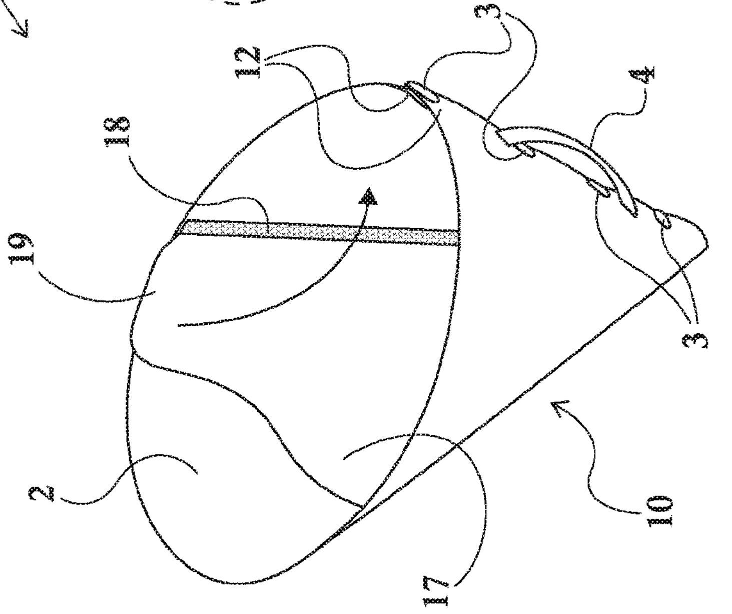

As illustrated in FIGS. 7 to 9, if the tab 19 is gripped and the lining 17 is rotated as shown by the arrow of FIG. 7, that is, from the side of the inside wall opposite to the overlapping edges 12 toward said edges, the lining 17 is positioned to cover the overlying line of the edges. In this manner, the utensil 1 can also be used to collect and pour liquids.

Figure 10:
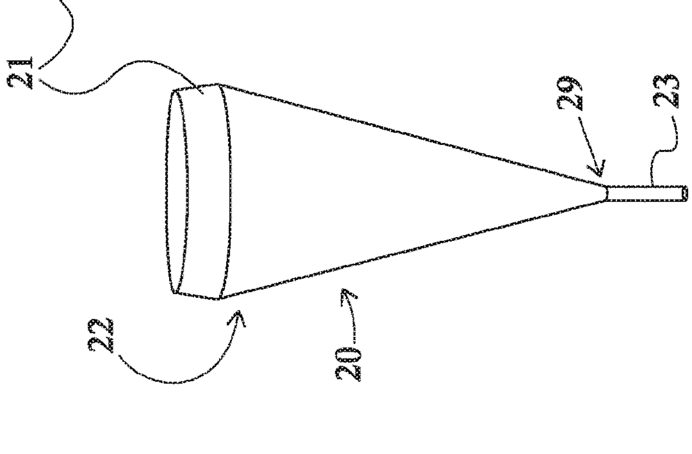
FIG. 10 illustrates a schematic perspective view of an additional element of the inventive utensil.

In accordance with a second variant embodiment, the utensil 1 (FIG. 10) comprises a funnel 20 or a glove that fits inside the utensil 1. Preferably, the funnel 20 includes an annular edge 21 that folds over the first widened end 22 and a narrow drain tube 23 at the tapered second end 29.

Figure 11:
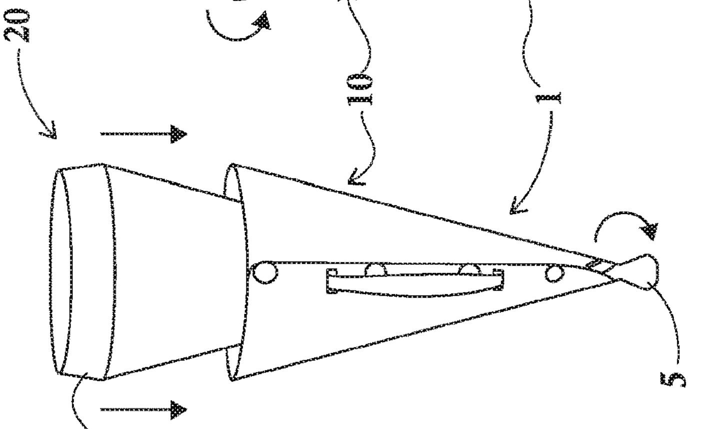
FIGS. 11 to 14 illustrate perspective views showing the assembling of the element of FIG. 10 on the inventive utensil.
Figure 12:
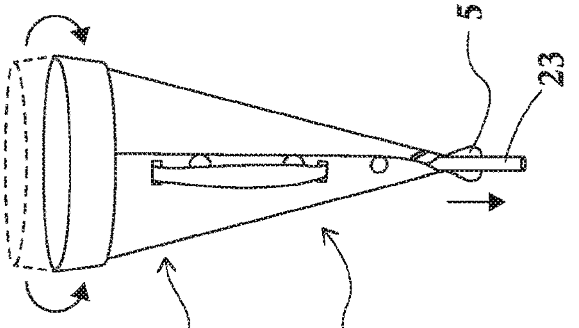

The funnel 20 is thus fit inside the utensil 1, allowing the narrow tube 23 (FIGS. 11 and 12) to protrude from the vertex of the cone of the main body 10. At this point, the funnel is reversibly locked by folding the annular edge 21 around the edge of the base of the cone.

Figure 13:
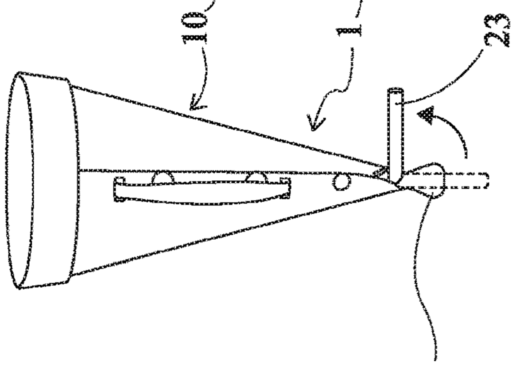
Figure 14:
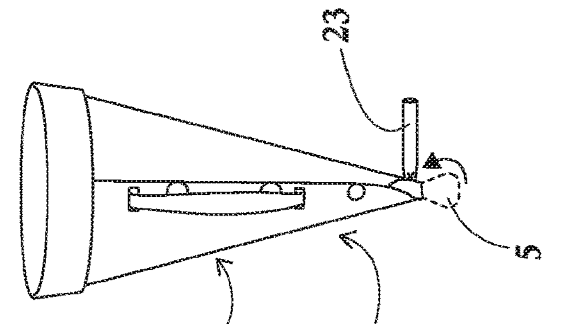

In this configuration, the utensil 1 can advantageously be used to pour liquids. Moreover, by bending the tube as shown in FIG. 13 it is possible to close the vertex of the cone of the main body 10 with the appendage 5 as previously explained. In this manner, at the same time, the drain tube is throttled (FIG. 14) and it is possible to hold a liquid inside the utensil, which, thus can be used as a container, in addition to being a funnel for liquids or solids.

Figure 17:
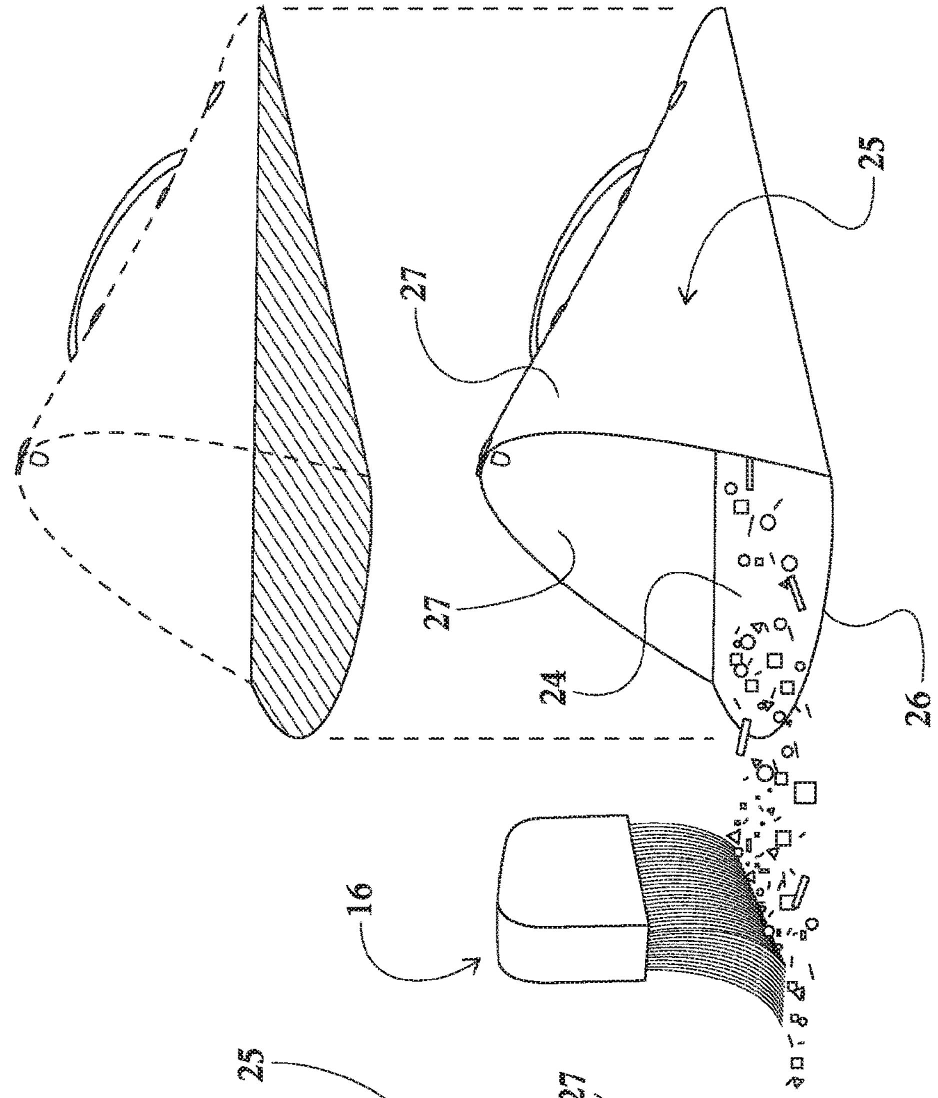
FIG. 17 illustrates a schematic perspective view of the utensil of FIG. 16 as seen from a different angle.
Figure 16:
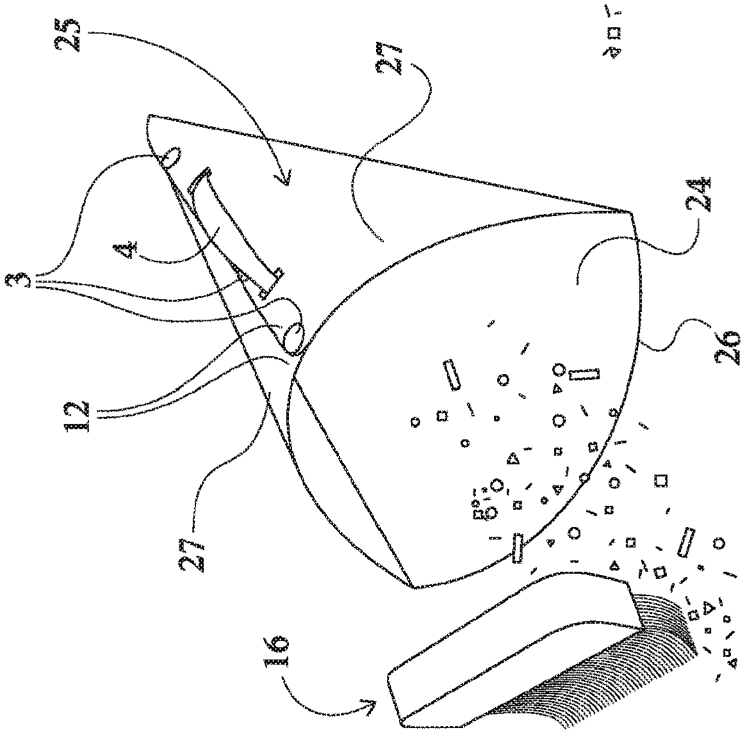
FIG. 16 illustrates a schematic perspective view of the utensil of FIG. 15 assembled in an operative condition.

In accordance with a further variant embodiment, the utensil 1 (FIGS. 16-17) can include a flat bottom 24 and a wall 25 that extends as a vault from said bottom. In particular, the bottom 24 has preferably generally the shape of a circular sector with an arcuate free edge 26 (FIGS. 16-17) that protrudes with respect to the vaulted wall 25 to ease the collection of dust, crumbs or other particulate material.

The vaulted wall 25 is made up of two flaps 27 folded and joined on the respective edges 12 in the same manner as previously described. On said joined edges 12 is also present, in the same way as previously explained, a handle 4.

This particular configuration is very useful in the case in which the utensil is to be used as a conventional scoop.

Figure 15:
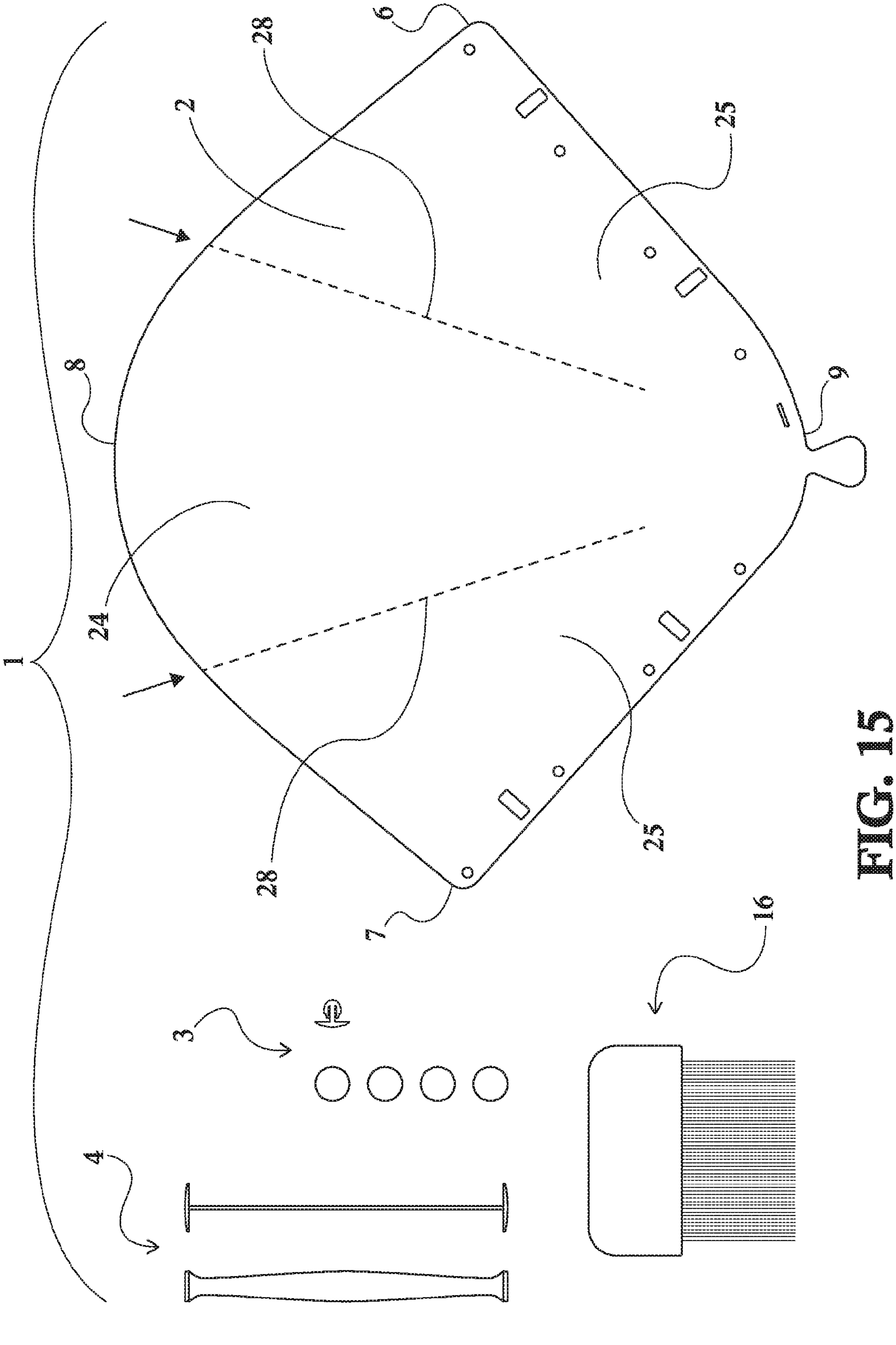
FIG. 15 illustrates a schematic plan view of the exploded-view drawing of the utensil of the present invention, according to a third embodiment.

Advantageously, as shown in FIG. 15, the configuration results from the previously described sheet 2, which will be provided with two creases (or weakened segments) 28 shown in FIG. 15, which run from the third edge 8 to near the fourth edge 9. These creases allow the two flaps 27 to fold upon themselves to join each other as already described with reference to the previous variant embodiments.

From what was previously disclosed, it is evident that the utensil according to the present invention resolves the shortcomings previously reported and achieves advantages in particular in terms of user friendliness, ease of production and assembly, and versatility.

In fact, the utensil can be made in an extremely easy manner from a sheet of foldable material, such as for example a plastic material, a cardboard, an aluminum sheet, a wood product sheet properly adapted to be folded, leather.

This sheet can be easily repaired, as it is sufficient to form a series of holes, openings and an appendix by means of punching, die cutting and similar production processes.

The buttons for locking the two edges of the sheet are also easy to make (or to find on the market), as is also the handle, which is just as simple to install.

The utensil can also be disassembled and stored in a small place and rapidly reassembled as needed.

Most of all, however, the utensil is advantageously versatile because thanks to its structure it can be adapted as a container for collecting powdery solid or granular material or as a container for transferring liquids, thanks to the above-mentioned variant embodiments.

Figure 19:
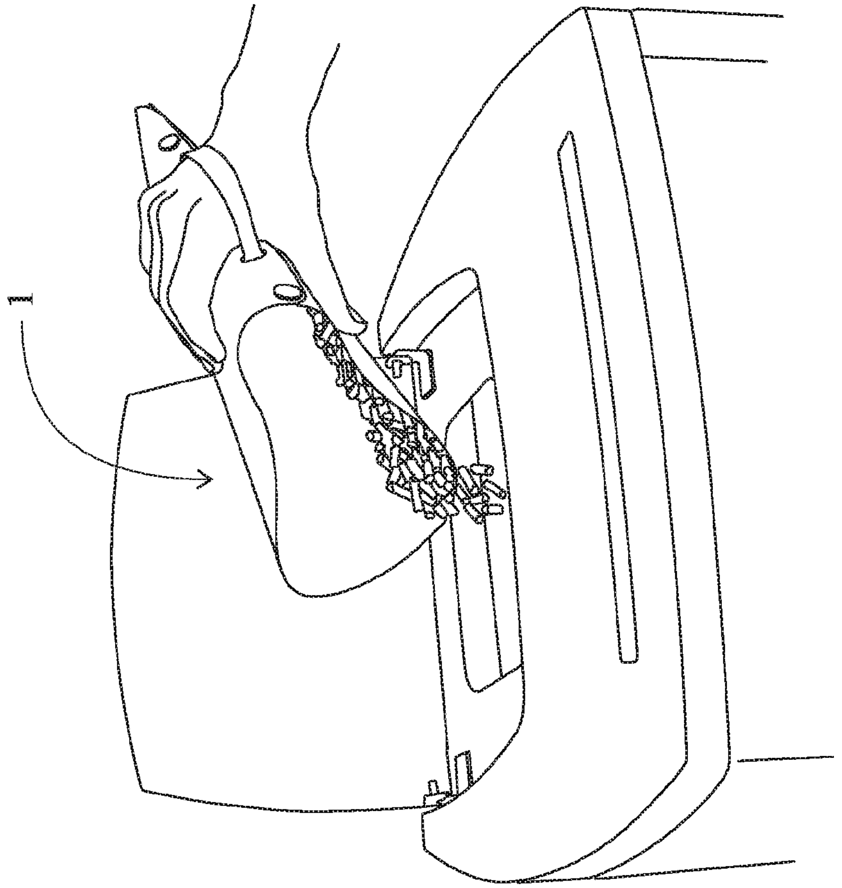
FIGS. 18 and 19 illustrate two views of the utensil of the present invention seen in operative phases according to an example of use.
Figure 18:
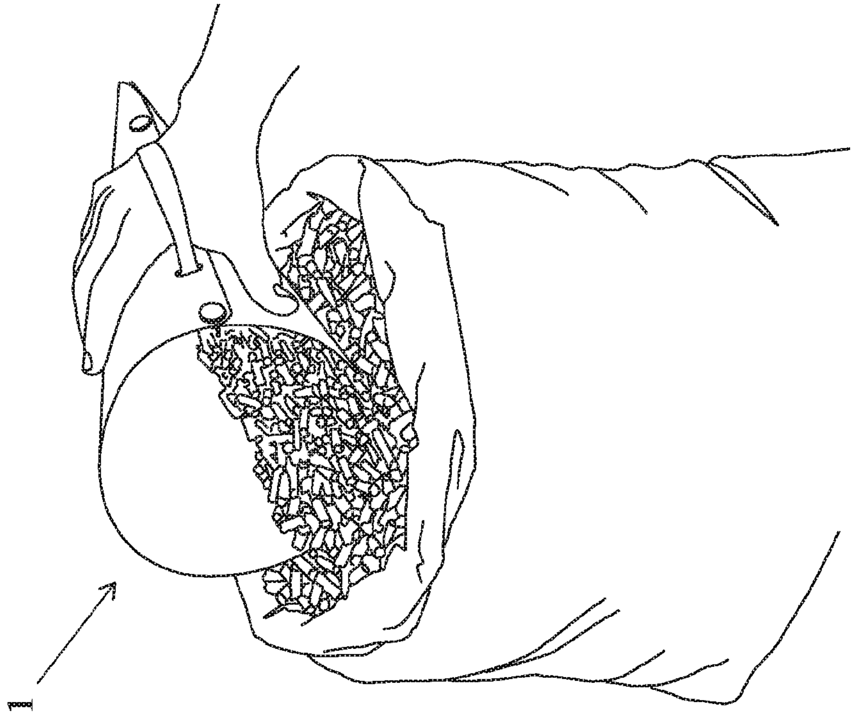

In particular, according to an example of use, as shown in FIGS. 18 and 19, the utensil 1 of the invention can be used as a container for pellets to be charged into a stove. In fact, as can be seen, thanks to its ergonomic and practical design, it can be easily gripped to collect pellets from a conventional bag and can be folded so as to easily pour the pellets into the pellet charging opening on the stove without spilling any of them outside.

Another great advantage is the possibility of considerably reducing the packaging and so making it possible to ship large quantities with a minimum encumbrance, while cutting handling costs and facilitating their storage arrangement.

The materials with which the utensil can be produced also makes it possible to use it for handling food products (as for example to meter ingredients).

The utensil of the invention is then subject to many variants, all within the area of expertise of the skilled technician, without however departing from the scope of patent protection of the enclosed claims.

For example, the joining means of the two edges of the sheet can consist of a Velcro system, snap clips, tabs formed from a notch on said sheet that engage said holes or appropriate slots.

Said funnel can also be formed from a rigid plastic material or can be a sort of preformed latex that can be adapted to the utensil.

The appendage that closes the cone of the main body can be provided with fixing means to guarantee a closure that is different from the engagement with the slit previously described. For example, it is possible to use the same buttons described with reference to locking the edges of the sheet or Velcro systems can be used instead.

The general forms of the utensil may change to suit specific requirements or preferences although the characteristic structure can be maintained to allow it to be disassembled and reassembled in the manner previously described so as to preserve the advantages associated with it.

Figure 20:
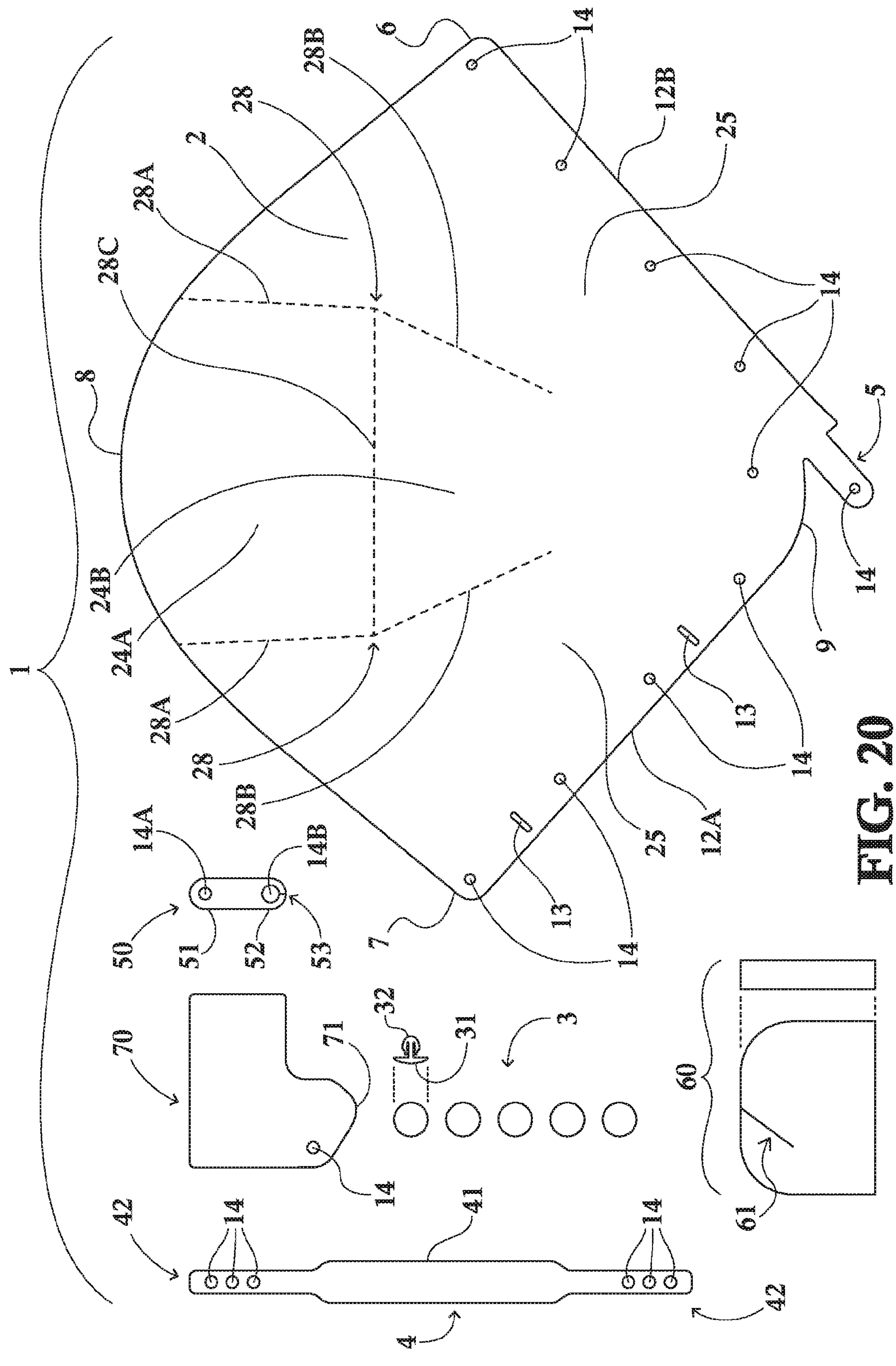
FIG. 20 illustrates a schematic plan view of the exploded-view drawing of the utensil of the present invention, according to a fourth embodiment.

With reference to FIG. 20, a further embodiment of the invention is shown in which the sheet 2 has a shape generally identical to the shape of the previous embodiments. Furthermore, identical reference numerals indicate identical parts.

In particular, the sheet 2 includes a first edge 12A provided with a plurality of holes 14 adapted to be reversibly engaged by corresponding buttons 3, and with openings 13 for the reversible engagement with gripping means 4. A second edge 12B preferably comprises only a plurality of holes 14 adapted to be engaged by the buttons 3, but it is not provided with the openings 13.

Moreover, the appendage 5 is provided with a hole 14 on its free end, in place of said cuts 11, such that it can be engaged by a corresponding button 3 as will be explained below. A further hole 14 is also provided on the sheet 2, near the fourth vertex 9 and proximal to the appendage, in place of the slit 15.

Advantageously, the sheet 2 comprises two first creases 28 (or weakened segments) that run from the third vertex 8 and approach each other at the fourth vertex 9, generally like the creases described previously. A second crease 28C connects said two first creases transversally and divides them into a first portion 28A and a second portion 28B. Preferably, the first portions start from the third vertex 8 and are substantially parallel, while the second portions start from the joining point with the second crease and extend toward the fourth vertex 9 in a converging trend. As explained below, this arrangement of creases makes it possible to have a configuration of the utensil, when desired, such as to lean against a surface with the third vertex completely levelled, so as to favor the collection of any crumbs. Or else, the utensil can be used in its conical configuration.

The reversible joining means 3 are identical to those previously described and, therefore, will not be described further.

The gripping means 4 are generally similar to those previously described. Preferably, said means are a handle with a flat and elongate portion 41 at whose extremities the tabs 42 are each provided with at least one length-adjusting hole 14, as will be explained later.

Figure 21:
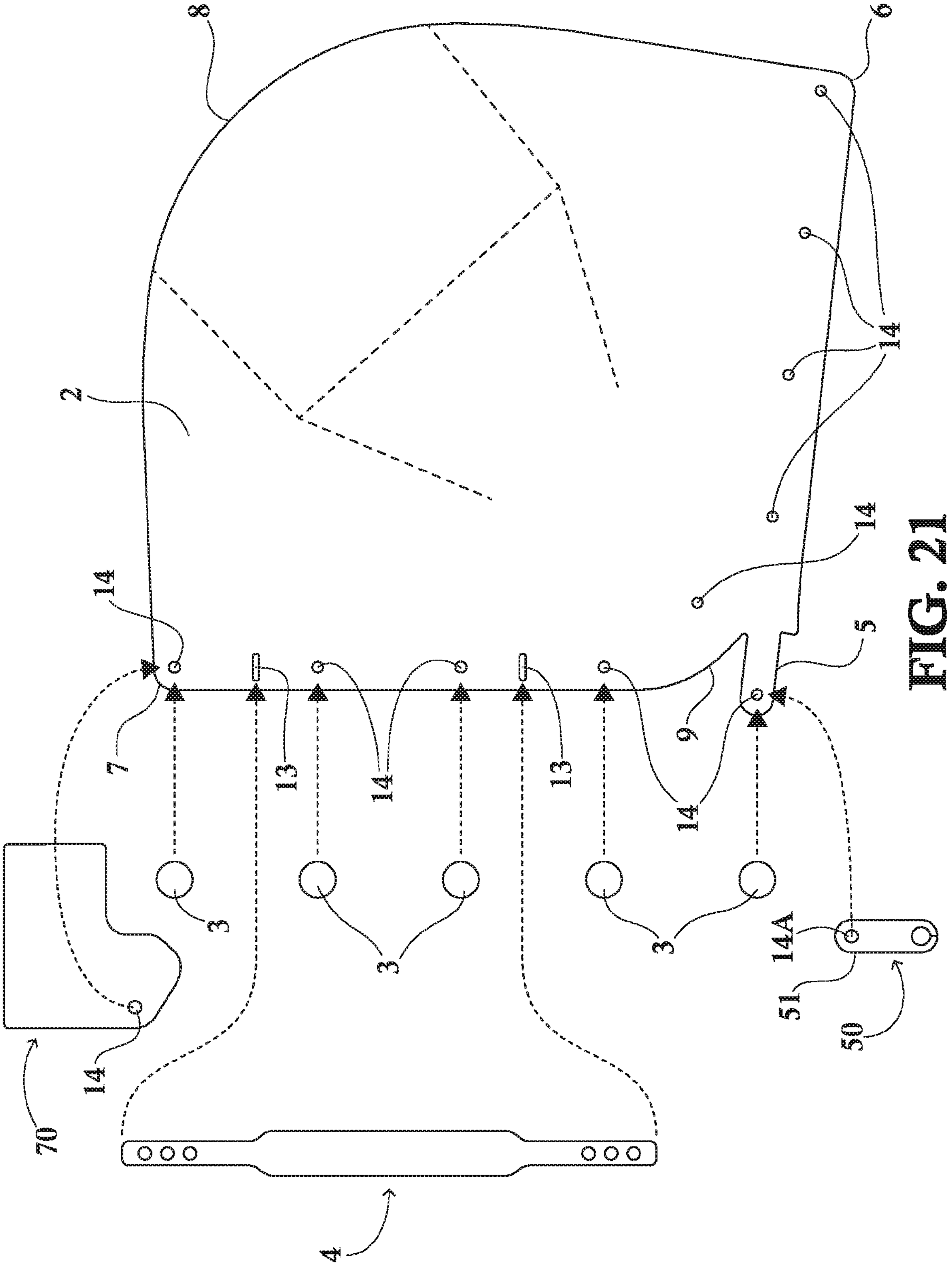
FIG. 21 illustrates a schematic view of the exploded-view drawing of FIG. 20 with the indications of the assembling positions of the various elements.

According to a further variant, the utensil 1 comprises a label 70 provided with a hole 14 made on a lateral portion 71. This label can be fixed reversibly on the sheet 2 so as to rotate on the same plane as the sheet and be alternatively exposed or concealed when the sheet is folded upon itself. The label makes it possible to display commercial information and/or usage details of the utensil 1, and can be imbued with essences to generate pleasant perfumes or absorb bad odors. For this purpose, the label can be made of absorbing material. In particular, the label can be fixed by means of said buttons 3, that engage both the hole 14 on the label and a hole provided near the first 6 or second 7 vertex of the sheet 2 (FIG. 21).

According to a still further variant, the utensil 1 can include hook means 50 adapted to suspend the utensil from a wall. Preferably, said means are made from a longitudinal strip having a first end 51 provided with a first hole 14A and a second end 52 provided with a second hole 14B (FIG. 20). The first hole is such as to be engaged by a button 3 like those previously described, while the second hole is such as to form a slot to be engaged, for example, by a nail, as described below. In addition, and preferably, the second end 52 is provided with a slit 53 to facilitate the engagement with a nail or a pin when the spaces do not allow a frontal connection. Likewise, such a slit allows an easy detachment from the nail by simply pulling the utensil downward from the handle. It should be noted that in this variant, the gripping means 4, the hooking means 50 and the label 70 are preferably and advantageously made with the same material as the sheet 2, and are obtained preferably by means of a die cutting process or similar processes.

As an alternative to the brush 16 described earlier, the utensil 1 may include a collecting spatula 60 consisting, for example, of a piece of semi-rigid, plastic and/or elastic and/or spongy material like polyurethane and foam rubber, which is used as a collecting means. This spatula can also be provided with a cut 61 that makes it possible to fix it removably to the sheet 2.

Figure 23:
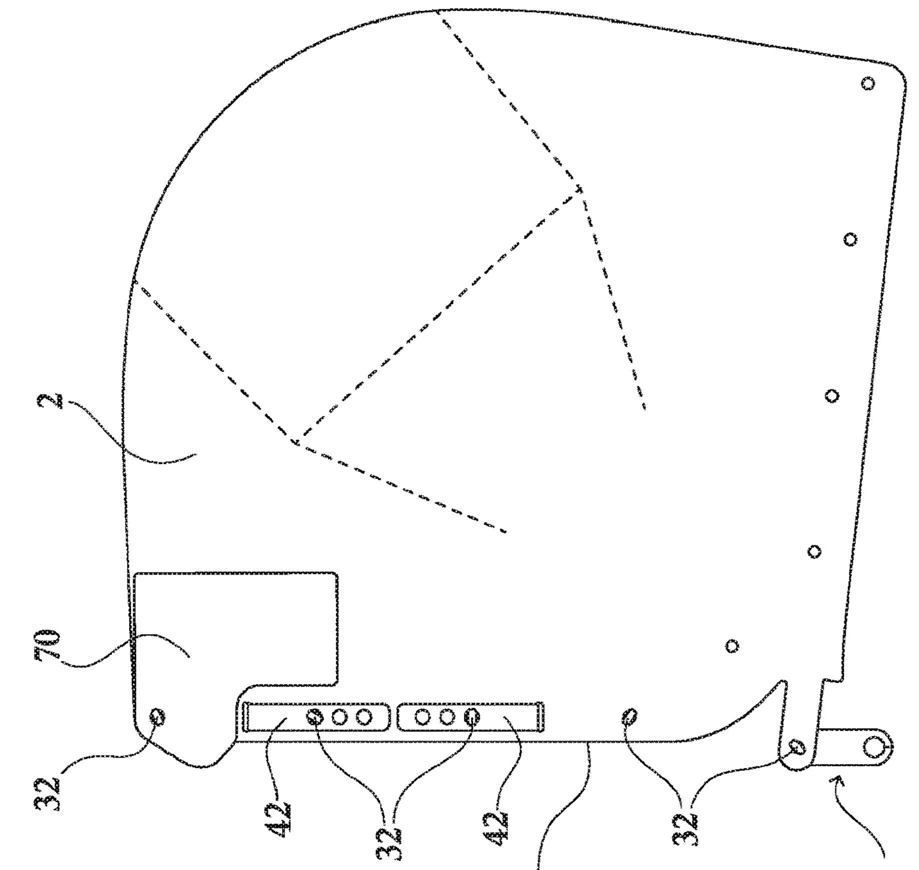
FIGS. 22 and 23 illustrate the embodiment of FIG. 21 with the elements assembled in an open condition, seen respectively from a first and a second side in plan view.
Figure 22:
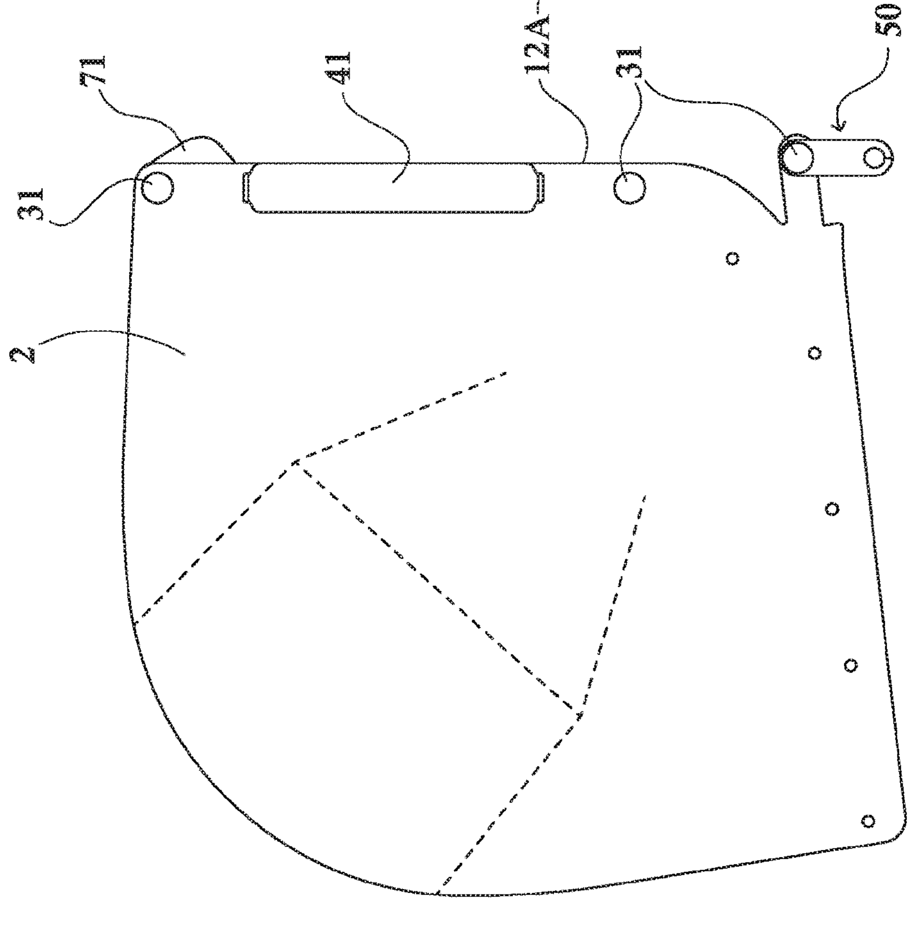

The elements that make up the utensil as presently described with reference to FIGS. 20 and 21 can be easily and quickly assembled. In FIG. 21, in fact, is illustrated by means of arrows the position in which the handle 4, the label 70 and the hook means 50 are fixed by means of the respective buttons 3. In particular, as is shown in FIGS. 22 and 23, the handle 4 is fixed to the first edge 12A of the sheet 2 by the engagement of a button 3 on a hole 14 of each of the two tabs 42 overlying a hole 14 of the first edge 12A, after the tabs have gone through the respective openings 13 and have been folded on the opposite side of the sheet 2 (FIG. 23) with respect to the side where the flat portion 41 of the handle remains (FIG. 22). The label 70 is fixed to the same folding face of the tabs 42 by a button that engages the hole 14 of its lateral portion 71 and the hole 14 of the sheet 2 on the second vertex 7. Likewise, the hook means 50 are fixed to the hole 14 of the appendage 5 by means of a button 3, after having superimposed said hole with the first hole 14A of the first end 51 of the hook means.

Figures 24, 25, 26:
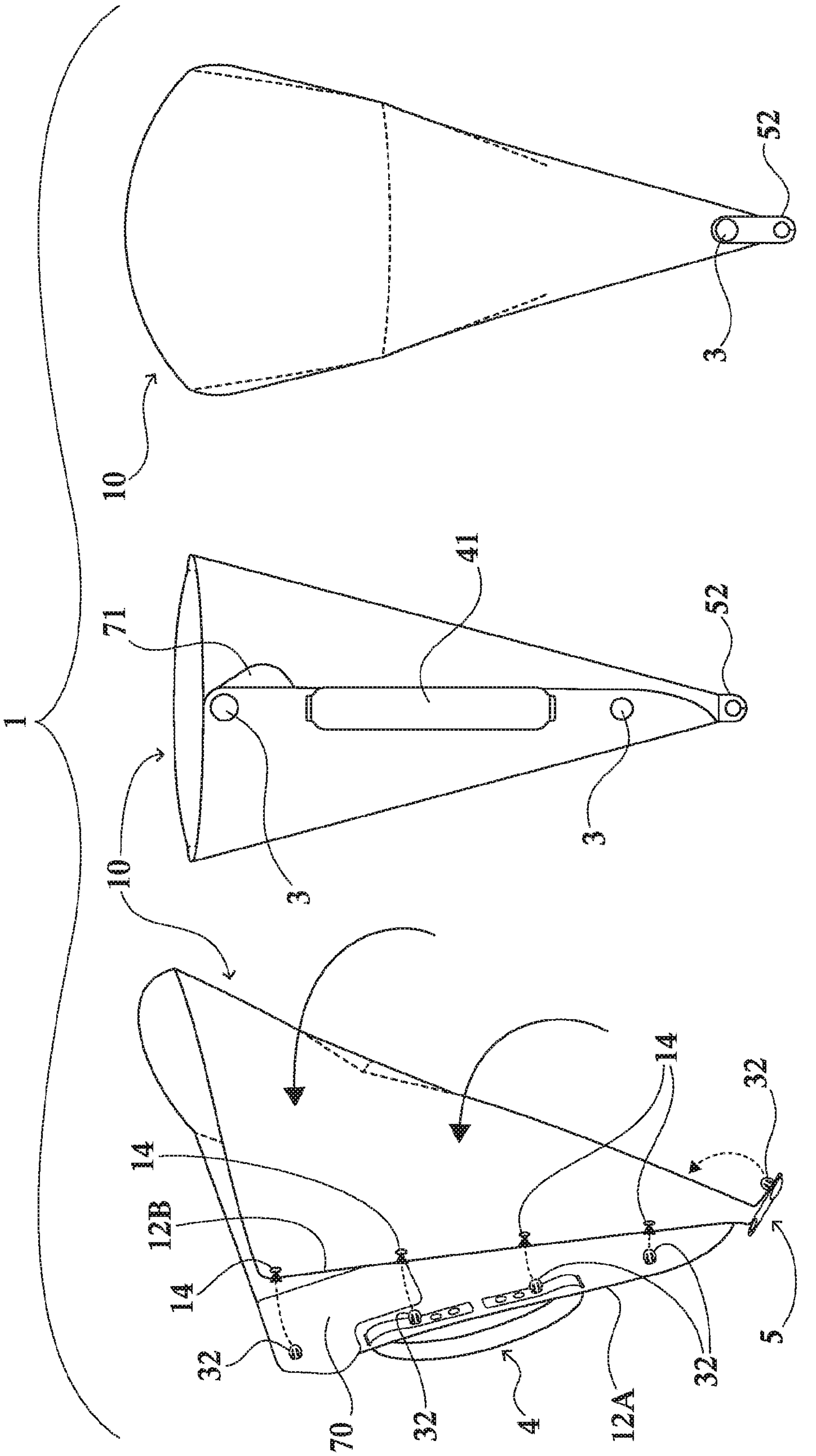
FIG. 24 illustrates the closing step of the embodiment of FIG. 21.
FIGS. 25 and 26 illustrate the embodiment of FIG. 21 closed and viewed from two opposite sides.

At this point, as shown in FIG. 24, the sheet 2 can be folded upon itself, overlying the two edges 12A and 12B and inserting the stem 32 of each button of the first edge in the corresponding holes 14 of the second edge. The utensil 1 has thus achieved its conic configuration as described previously (FIGS. 25 and 26).

Figures 27, 28:
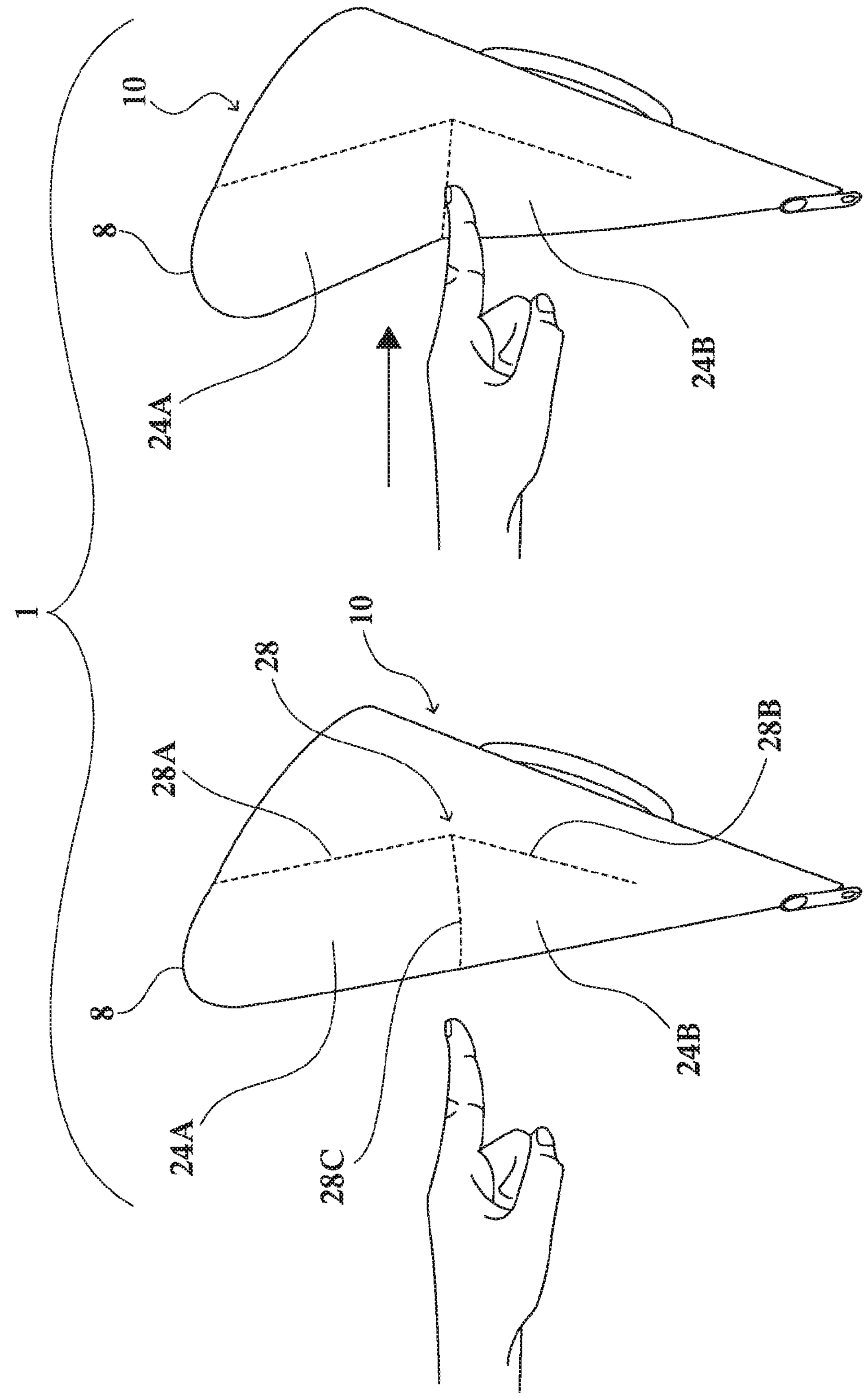
FIGS. 27 and 28 illustrate a posterior axonometric view of the embodiment of FIG. 21, respectively before and after a modification of its shape.

With reference to FIGS. 27 and 28, the general conic shape of the device 1 can be reversibly modified so as to have a configuration such as to make dust collection easier. In fact, thanks especially to the arrangement of the second crease 28C transversal to the two first creases 28, it is possible to apply a pressure with a finger or against an edge or a corner, for example of a table, on such third crease, to obtain a collapse or a dipped deformation of the conic shape. The result is the formation of a first flat portion 24A comprised between the fourth vertex 8, the first portions 28A of said two first creases 28 and said second crease 28C, and a second flat portion 24B comprised between said second crease 28C and the second portions 28B of said two first creases 28.

Figure 29:
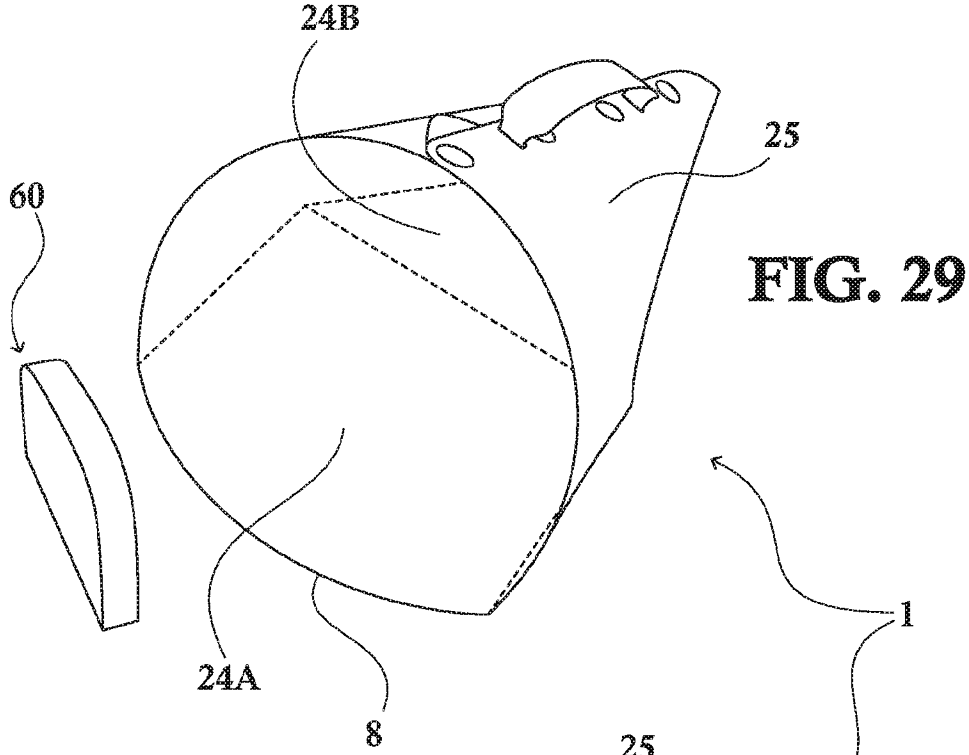
FIGS. 29 and 30 illustrate two different views of the embodiment of FIG. 28 in a condition of use.
Figure 30:
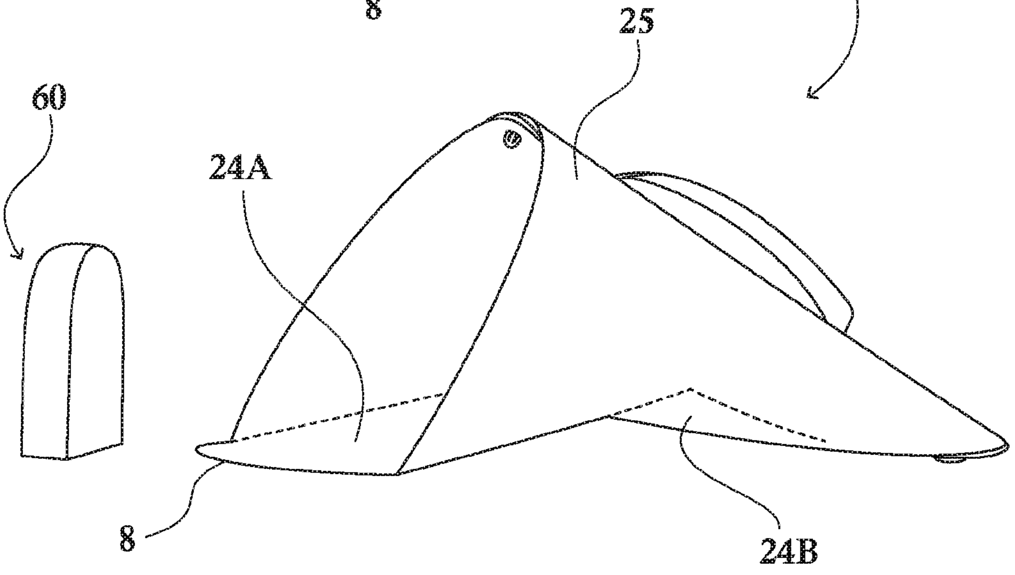

Advantageously, this deformation creates a first flat portion 24A such that the third vertex 8 is able to adapt perfectly to the surface to be cleaned (FIGS. 29 and 30). In addition, said first portion forms a collecting ramp followed by a descending plane (second flat portion 24B) which facilitates the holding of the collected dust. In fact, as can generally occur with the conventional scoops, the collecting plane is uniformly inclined upwards during the collection with a brush, with the risk of allowing the dust just collected to fall back out of the scoop by gravity.

It should also be remembered that the vaulted portion 25 of the utensil creates a lead-in for the dust toward said second portion 24B, preventing it from being scattered upward and returned toward the first portion 24A.

Figures 31, 32, 33:
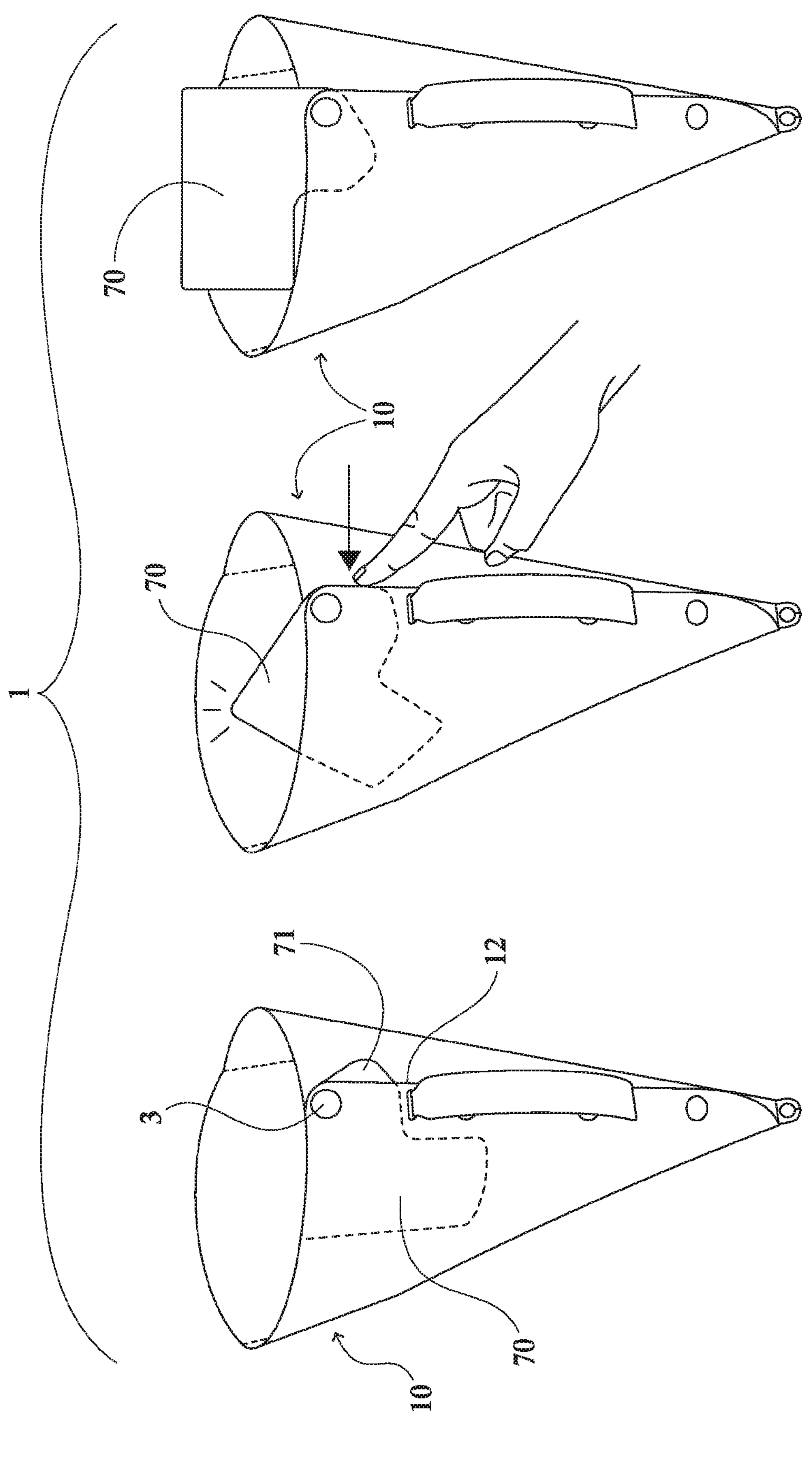
FIGS. 31, 32 and 33 illustrate three different views of the embodiment of FIG. 25 in a first configuration.

Advantageously, then, if the utensil 1 is provided with said label 70, in its assembled configuration (FIG. 31), said label is hidden inside the cone. As shown in FIG. 32, with a slight push of the finger on the portion 71 projecting from the two overlapping edges 12, the label rotates on the button 3 that fixes it to the cone and comes out at least partially from the cone so that it can be gripped and extracted (FIG. 33). In this manner, the information printed on it can be displayed or the essence contained in it can be released, for example by removing a protective film.

Figures 34, 35, 36:
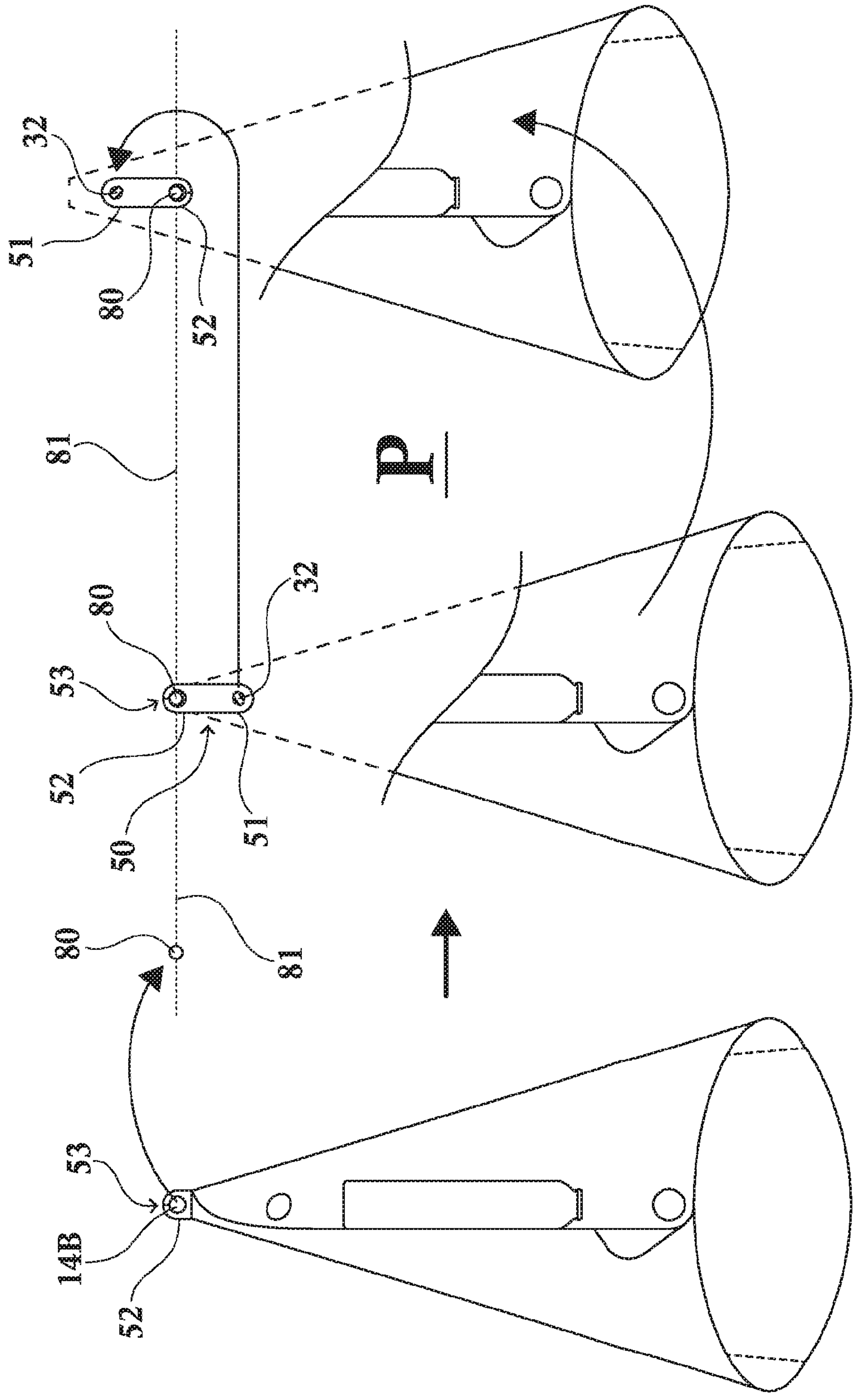
FIGS. 34, 35 and 36 illustrate three different views of the embodiment of FIG. 25 in a second configuration.
Figure 38:
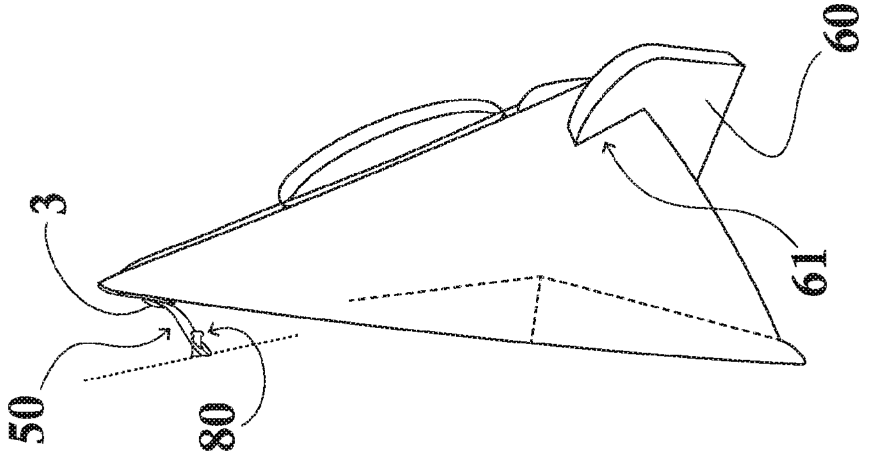
FIGS. 37 and 38 illustrate two views of the utensil of FIG. 36 according to two different perspectives.
Figure 37:
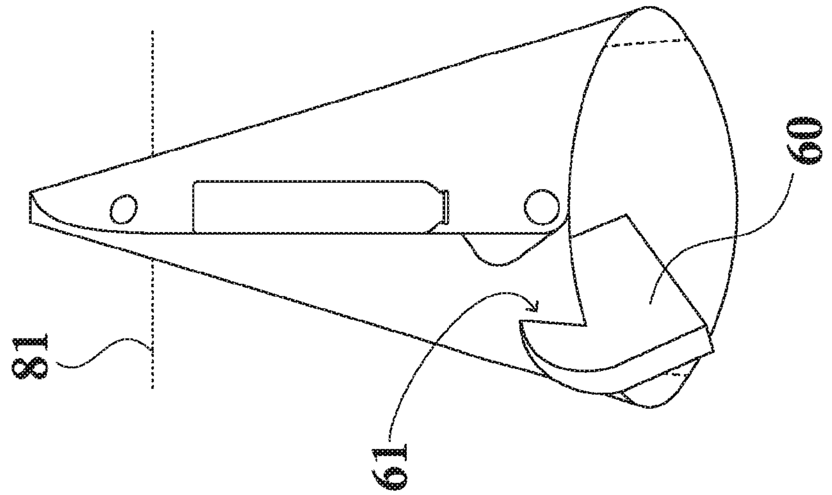

Advantageously, moreover, the utensil 1 can be hung on a wall P, as shown in FIG. 34. In fact, thanks to the hook 50 the tool can be hung from the wall P by engaging the second hole 14B with, for example, a nail 80 (FIG. 35). It is also possible to hide the hook 50 thanks to its rotation on the button 3 that fixes the cone of the utensil 1, as shown in FIG. 36, where it can be seen that the rotation shown by the arrow allows the utensil to lift from the horizontal line 81 on which the nail lies and to cover it with a pleasant effect of suspension in the air.

It should be remembered that all the variants previously described and illustrated in the figures enclosed with the present description can be combined with each other. By way of example, the label of the variant of FIG. 20 can be applied with any of the embodiments previously described and illustrated in FIGS. 1 to 19. In the same way, as a further non-limiting example, the funnel 20 can be applied to the embodiment of FIG. 20. As an alternative, the inside of the utensil can be lined with a common plastic bag for the collection of unsorted waste or with a biodegradable ecological bag for collecting organic household waste.

Figure 40:
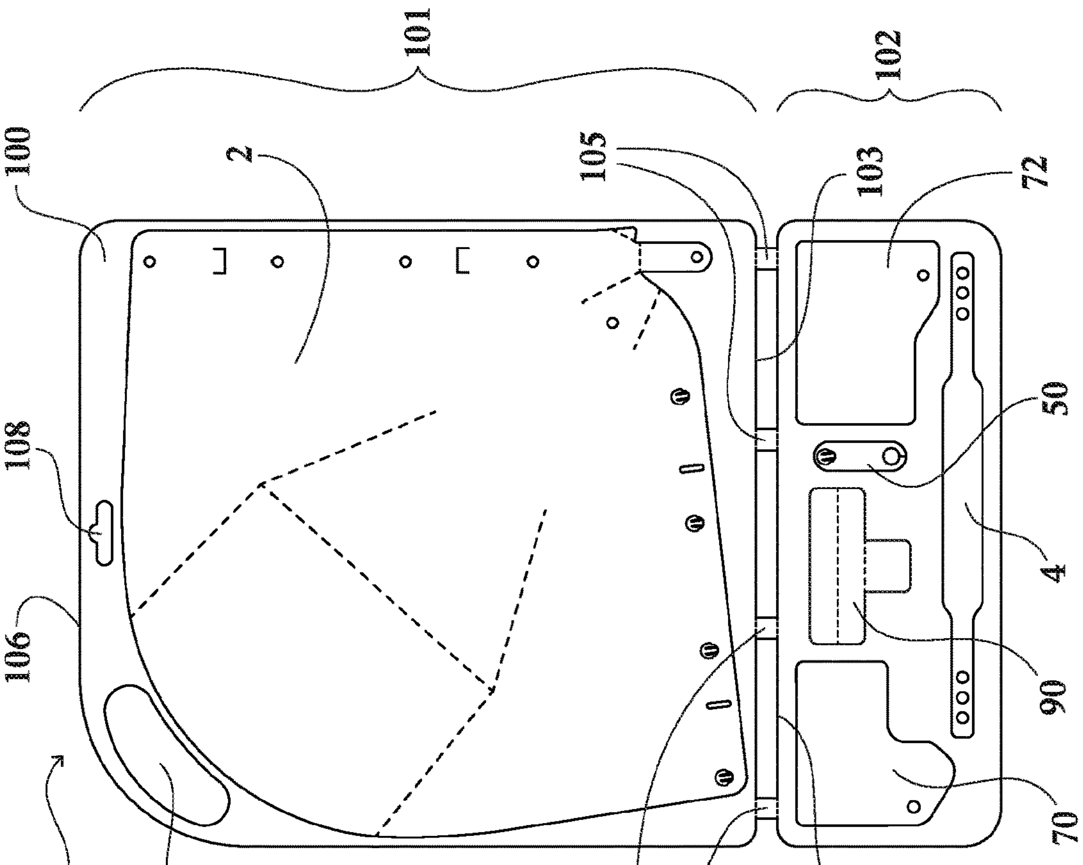
FIGS. 39 and 40 illustrate two plan views from a first and a second side of the utensil of the invention contained in a first support.
Figure 39:
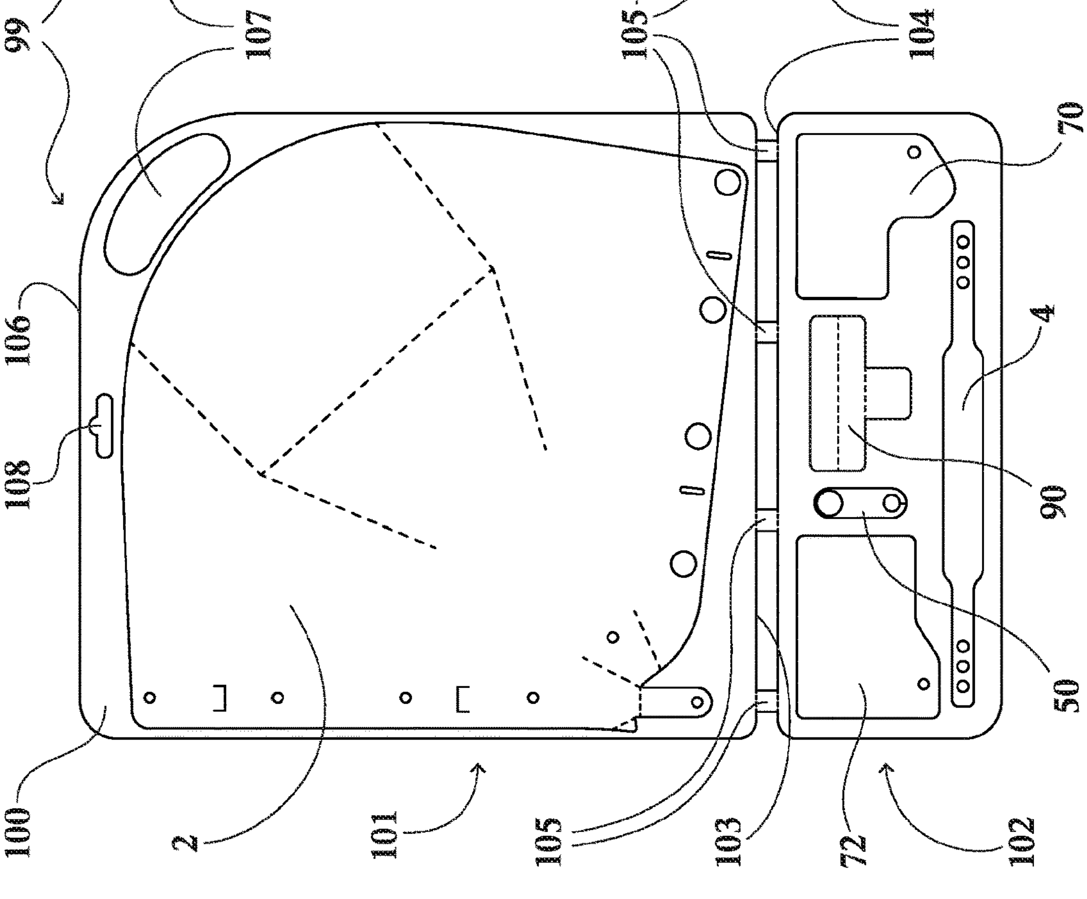

FIGS. 39-40 illustrate a composition 99 of all the components of the utensil 1 of the invention assembled and contained in a support 100. In particular, the support 100, the utensil 1 and its accessories are made from the same sheet of material and preferably by means of a die cutting process.

The utensil 1 and its accessories in this version are held on the support 100 by detaining points formed on the material along the lines and portions that delimit the geometrical shapes of the utensil and of its accessories. In this manner, a great convenience is guaranteed in the transportation of the utensil before the components are separated from the support, by breaking the detaining points, which are then to be mounted again, as well as a storage convenience, thanks to the prearrangement of a single preformed sheet.

Preferably, the support 100 is formed by a first portion 101 or main portion and a second portion 102 or secondary portion. The main portion 101 carries the sheet 2 which will form the body 10 of the utensil, while the secondary portion 102 carries the accessories of the utensil. The two portions are joined to each other along two respective first edges 103 and 104 preferably by means of bending bridges 105.

In addition, preferably, at a second edge 106 of the first portion 101, opposite the first edge 103, is present a first holding hole 107 for carrying the support 100 by hand and a second hole 108 to engage a hook or a nail (not shown) that makes it possible to store it in the warehouse or shop.

Figure 42:
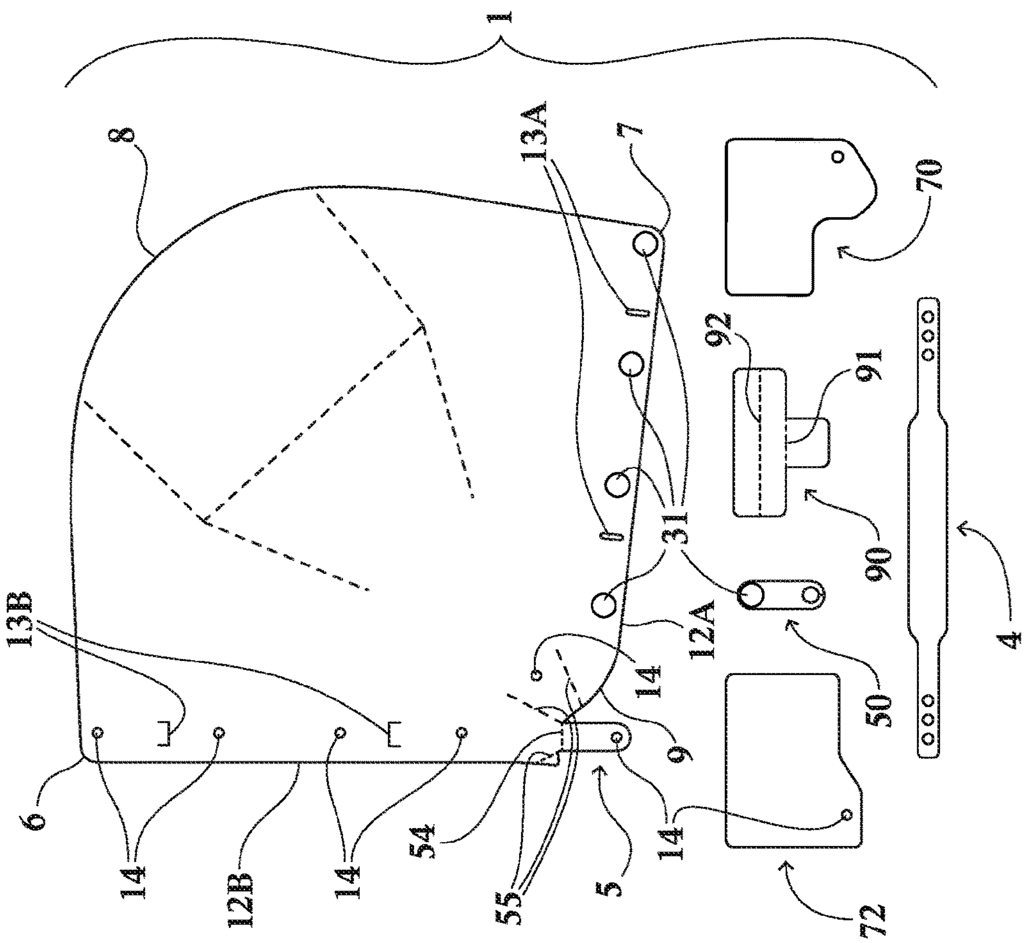
FIGS. 41 and 42 illustrate two plan views of the utensil of FIG. 39 with all its components separated from its support.
Figure 41:
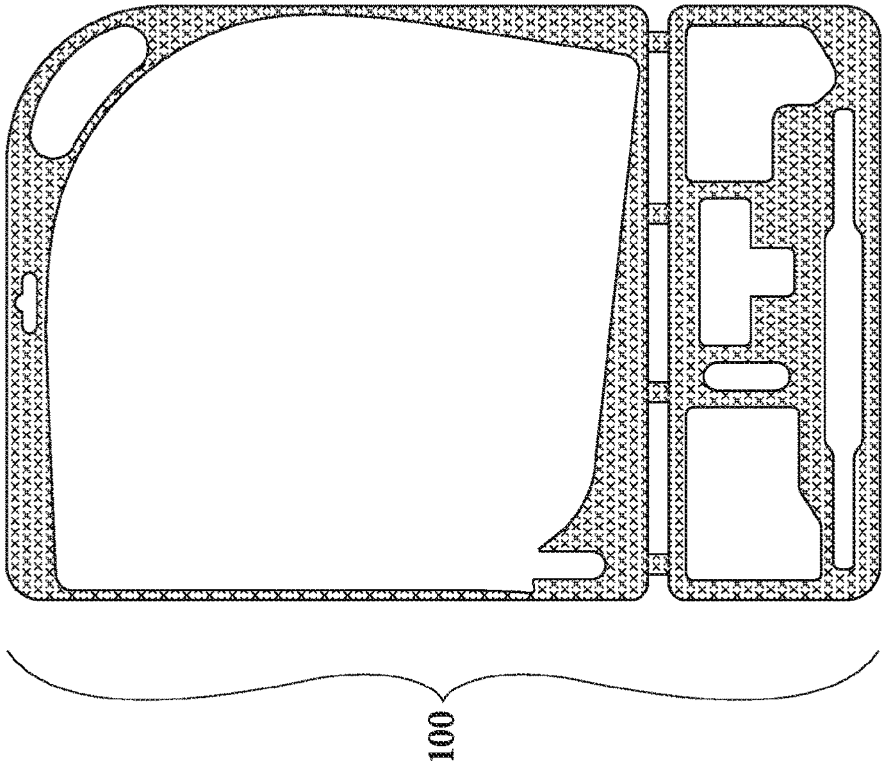

As already mentioned, the first portion 101 comprises the sheet 2 that will form the body 10 of the utensil 1. This sheet substantially corresponds to the one described earlies and, therefore it will not be detailed and in the figures it will have the same reference numerals. It should be noted that in this prearrangement the sheet 2 is provided with said buttons 3 already engaged in the corresponding holes 14 of its first edge 12A. Moreover, the first edge 12A comprises openings 13A to engage the tabs 42 of the handle 4, and the second edge 12B comprises cuts 13B to engage said tabs. Furthermore, the appendage 5 is connected with the fourth edge 9 of the sheet 2 by means of a crease line 54 that facilitates its bending. A set of creases 55 extend then from said fourth edge of the sheet: two toward the second portions 28B of said creases 28 and one toward the second edge 12*b* of the sheet (FIG. 42).

The secondary portion 102 comprises, for example, the handle 4 previously described, one or more labels 70 and/or spatulas 72, a hook 50, a felt-tip pen holder 90. The label corresponds to the one previously described; the spatula has a shape that is generally identical to the label and with its structure it is particularly adapted for collecting crumbs, debris, dust, or to be used as a scraper. The hook 50 also is the one previously described and is provided with the corresponding button 3, while the pen holder 90, as is better illustrated in FIG. 42, consists of a flat portion generally having the shape of a T in which the stem is attached to the head through a weakened segment 91, as well as the head is longitudinally divided by a weakened part 92 of the same.

Figure 43:
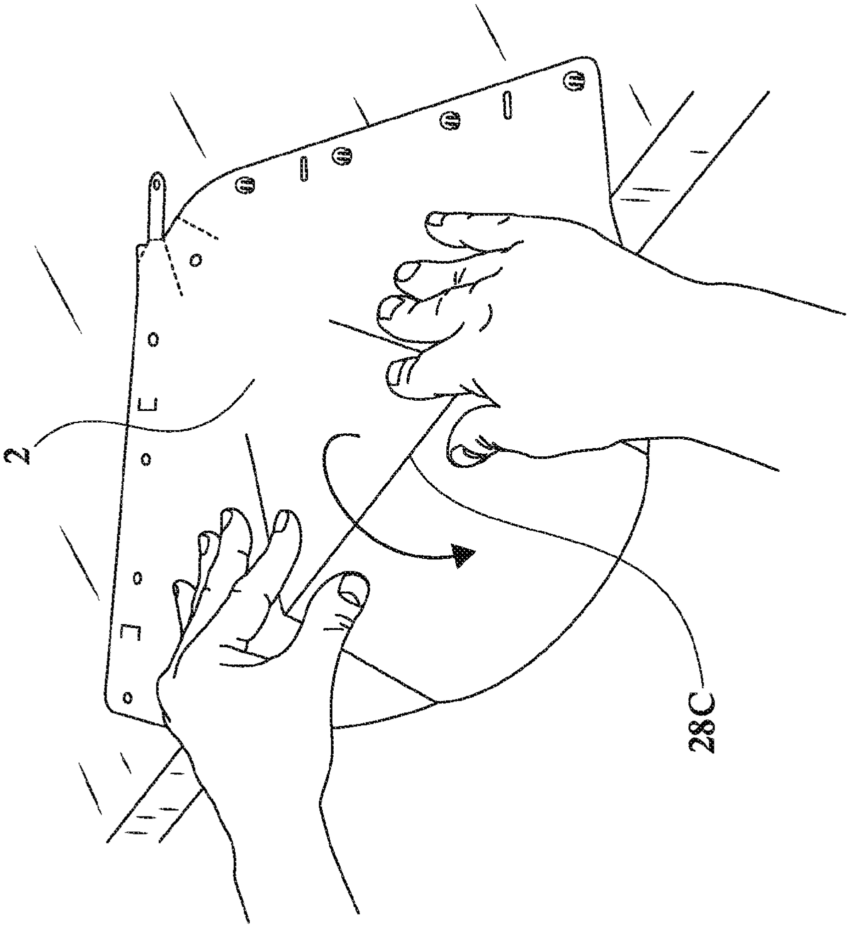

In FIG. 43 is shown a first step of assembling the utensil of the invention. After having detached the sheet 2 from said support 100, by breaking the detaining points or the weakened edging segments (FIG. 42), the sheet 2 is bent along the second crease 28C toward the face of the sheet from which the heads 31 of the buttons 3 protrude. This operation can be carried out by using, for example, the edge of a table.

Figure 44:
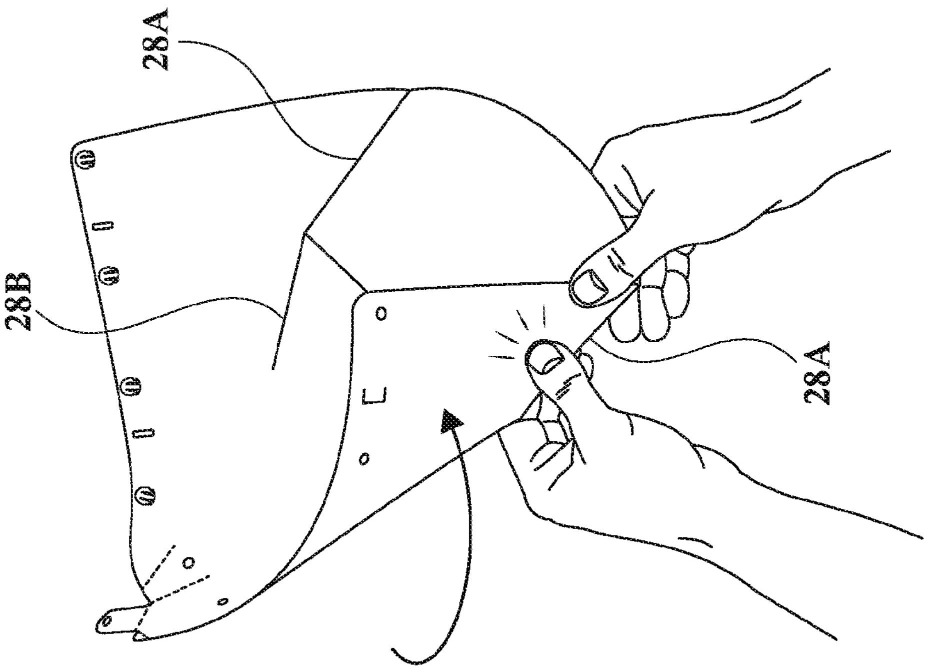
FIGS. 43 and 44 illustrate a first and a second step of assembling the main body of the utensil of FIG. 42.

After this, two more bendings are carried out along, respectively, the creases 28A, and two more bendings are made along the creases 28B toward the face of the sheet from which the stems 32 of the buttons protrude (FIG. 44).

Figure 46:
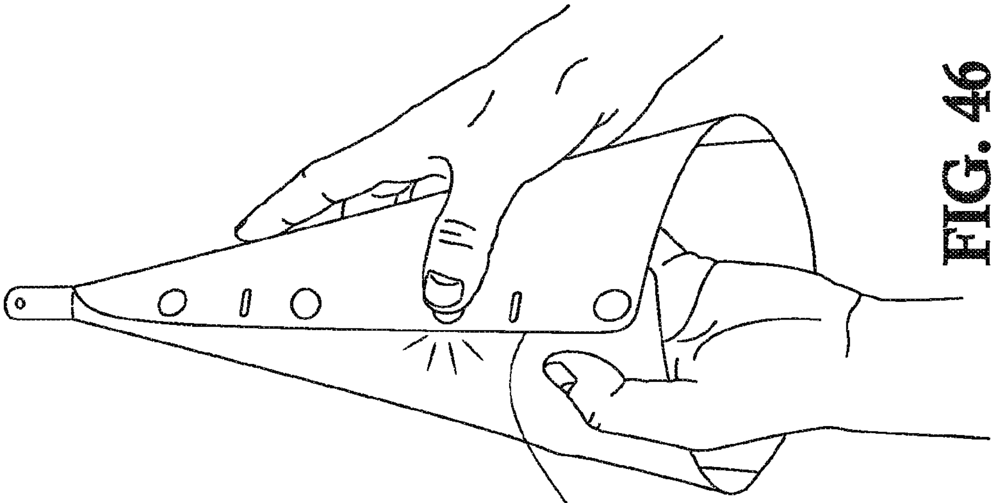
FIGS. 45 and 46 illustrate a third and a fourth step of assembling the main body of the utensil of FIG. 42.
Figure 45:
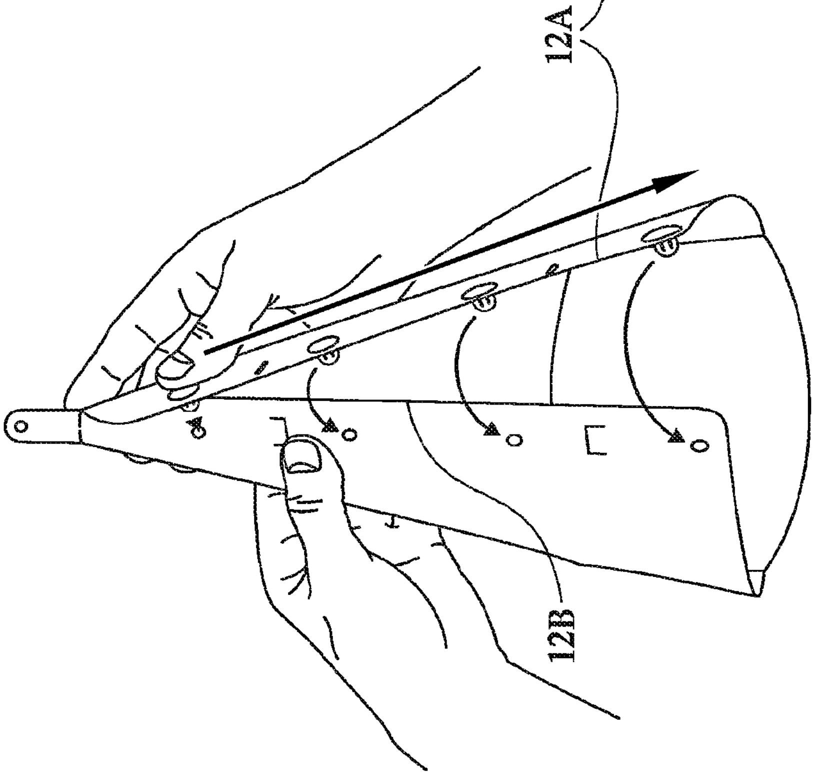

At this point, proceeding with along the arrow shown in FIG. 45, the sheet 2 is linked to itself by engaging the stems 32 of the buttons 3 of the first edge 12A with the holes 14 of the second edge 12B, closing the body 10 of the utensil (FIG. 46).

Figure 47:
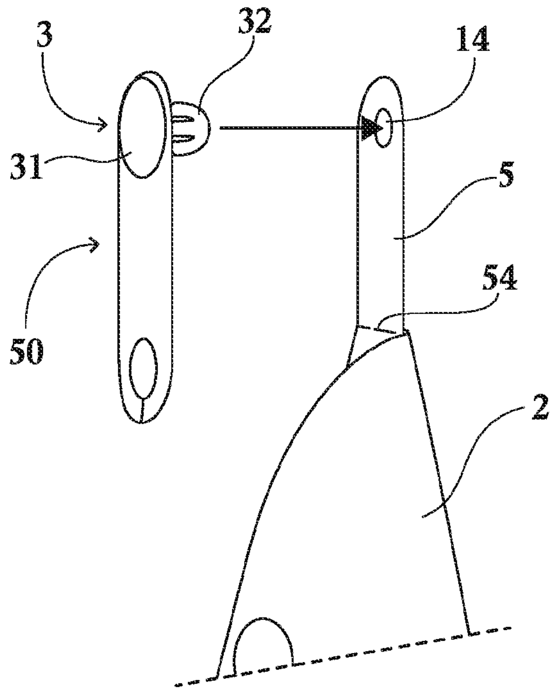
FIGS. 47 to 50 illustrate the final steps of assembling the main body of the utensil of FIG. 42 with a hook for hanging it.
Figure 48:
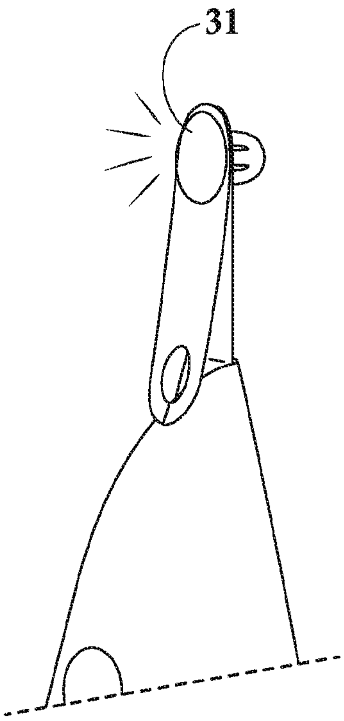
Figure 49:
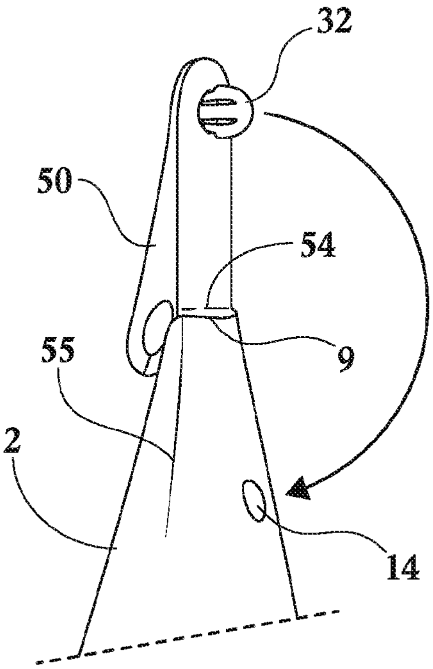
Figure 50:
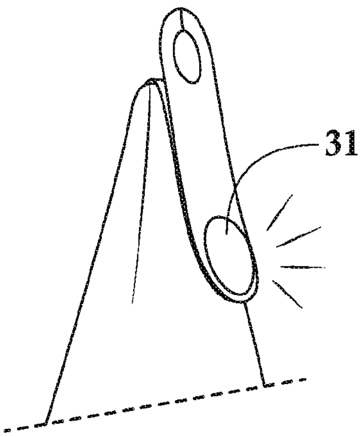

At this point, the various accessories can be applied. The hook 50 can be applied to the appendage 5 of the sheet 2 by inserting the stem 32 of its button 3 into the hole 14 of the appendage (FIGS. 47-48). Finally, the appendage 5 is bent (this operation is facilitated thanks to the crease 54) until the stem 32 of said button 3 engages the hole 14 formed near the fourth vertex 9 of the sheet itself (FIGS. 49-50), this operation will join the base of the appendage (corresponding to the crease 54) with the vertex 9 and cause a sort of sealing. This closing operation is facilitated not only by said crease line 54 but also by the creases 55.

Figure 51:
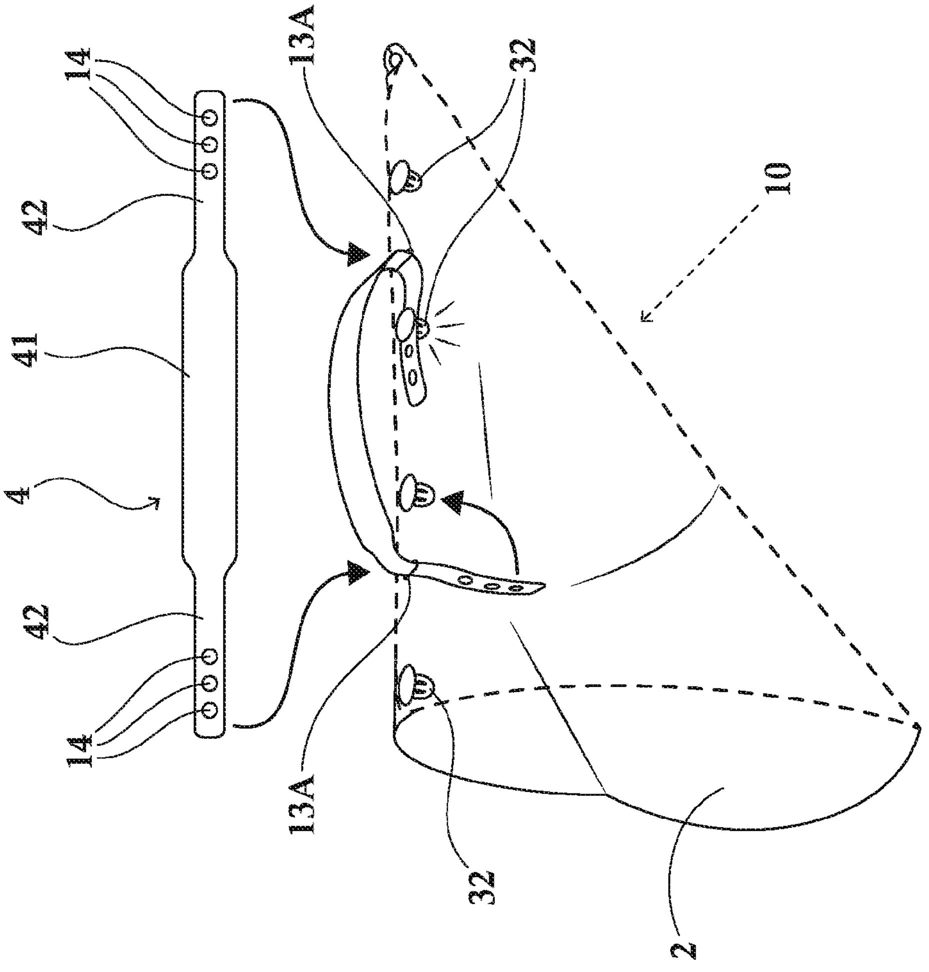
FIGS. 51 and 52 illustrate respectively the steps of assembling a handle and a spatula on the main body of the utensil of the invention.

The handle 4 is mounted by inserting each of the respective tabs 42 first into an opening 13A of the first edge 12A of the sheet 2 and then into the cut 13B of the second edge 12B which now is superimposed on the first edge, bending them toward the flat portion 41 of the handle. Finally, the respective holes 14 are engaged with the stems 32 of the buttons 3 according to the desired lengths (FIG. 51). It should be noted that the cut 13B is not in a real hole, therefore it guarantees a sealing against any accidental escape of dust or other collected material.

Figure 52:
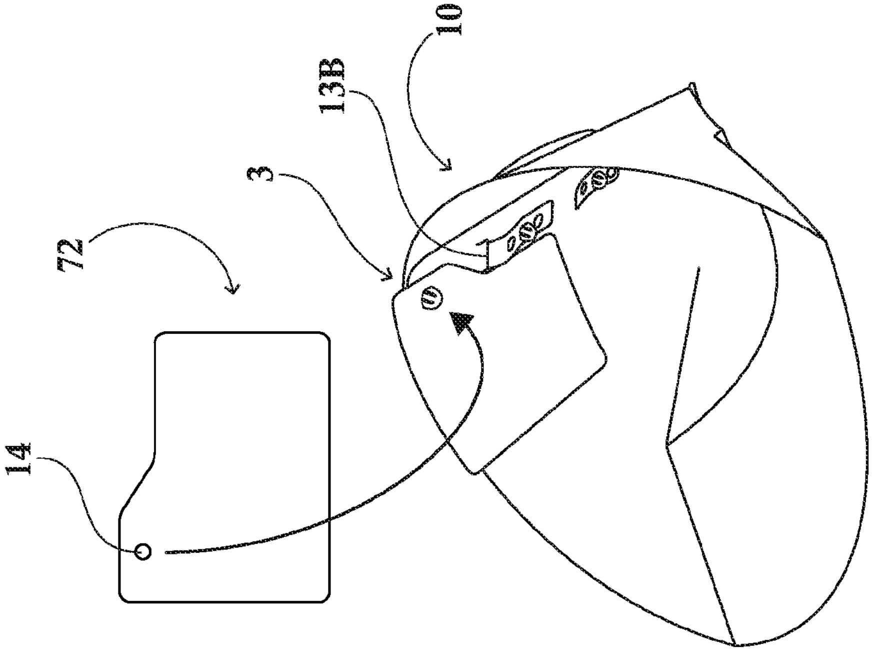

The spatula 72 is applied internally to the body 10 of the utensil by engaging its hole 14 with the button 3 that is nearest to the opening of the cone (FIG. 52).

Figure 53:
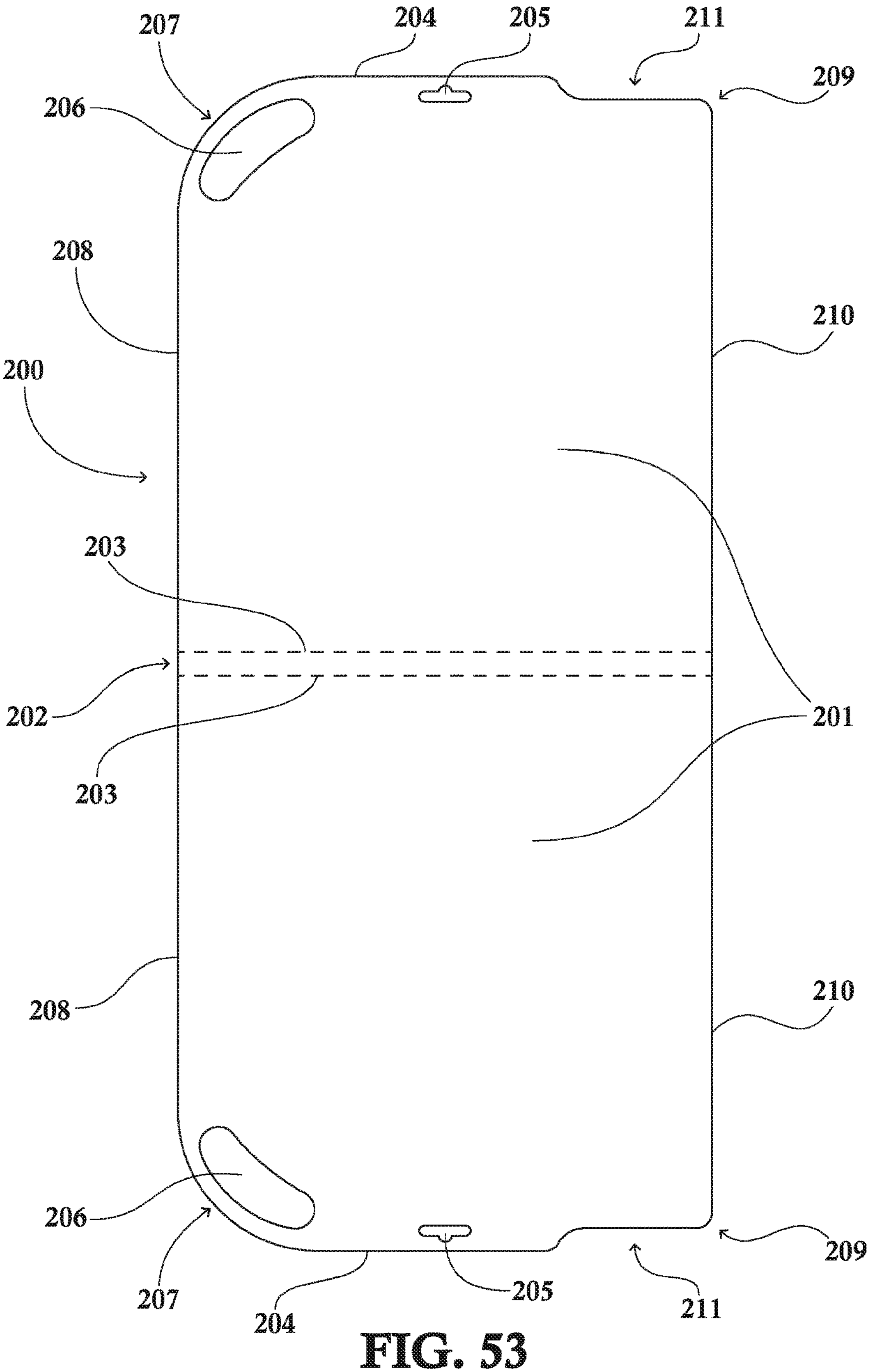
FIG. 53 illustrates a plan view of a packaging of the utensil of the invention in an open configuration.

With reference to FIG. 53, a plan view is shown of a packaging 200 particularly suited to contain the support 100 that carries the utensil 1 and the respective accessories previously described.

In fact, the packaging 200 consists of a sheet divided in two identical and superimposable portions 201 thanks to a hinge element 202. The hinge element connects the two portions 201 along a first edge 203 of the same that is transversal to the longitudinal extension of the open sheet in a plan view.

Preferably, the hinge element is made up of two parallel weakened segments that coincide with said two first transversal edges 203.

In addition, near each of the two second transversal edges 204 of the sheet, opposite the respective first transversal edges, are formed a first central hole 205 and a second hole 206 formed on a first corner 207 of said edge with a first longitudinal edge 208. The first hole corresponds to the second hole 108 of said support 100 for suspending the packaging. On the other hand, the second hole 206 corresponds to the first hole 107 of the support 100 as a gripping handle.

It should be noted that near a second corner 209 with a second longitudinal edge 210 of said second transversal edge 204 of each portion 201 is formed a window 211.

Figure 54:
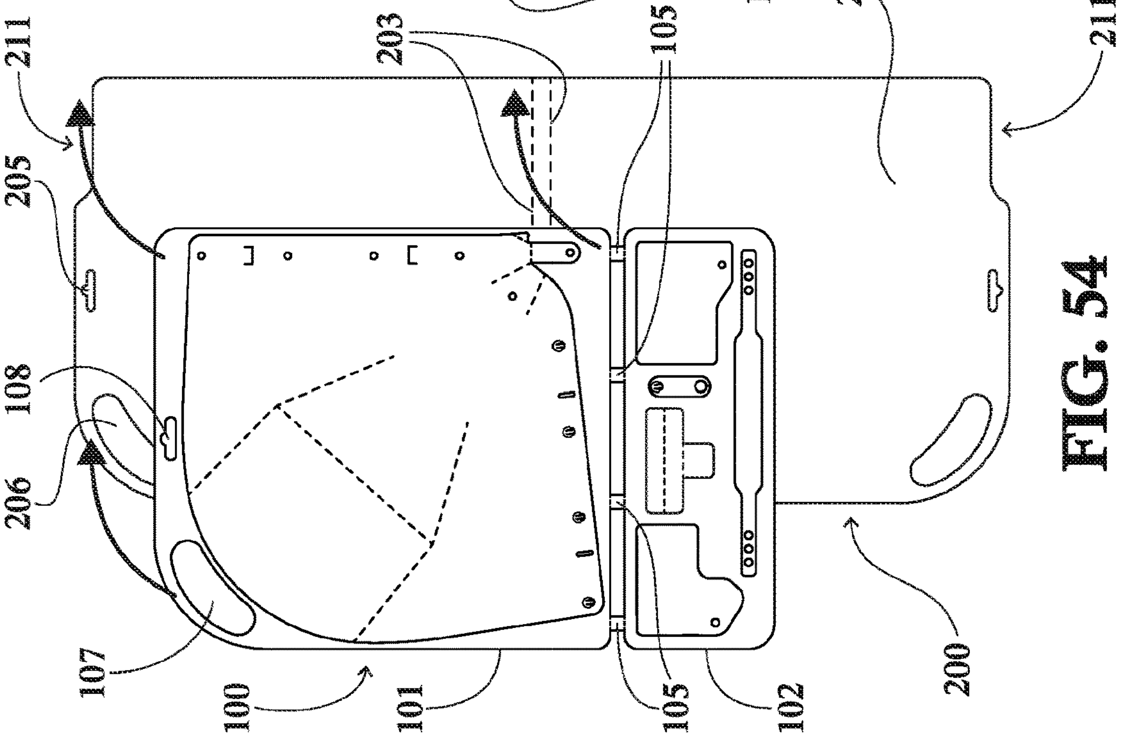

As illustrated in FIGS. 54 to 57, the packaging 200 in the open flat configuration presently described can receive as a prop the support 100 containing the utensil 1 with the accessories previously described. In particular, the support is set down on a portion 201 of the packaging so as to make the first hole 107 of the support coincide with the second hole 206 of the packaging and, at the same time the second holes 108 of the support with the central one 205 of the packaging (FIG. 54). It should be noted that the first portion 101 of the support coincides substantially with a portion 201 of the packaging, except at said window 211 of the packaging.

Figure 55:
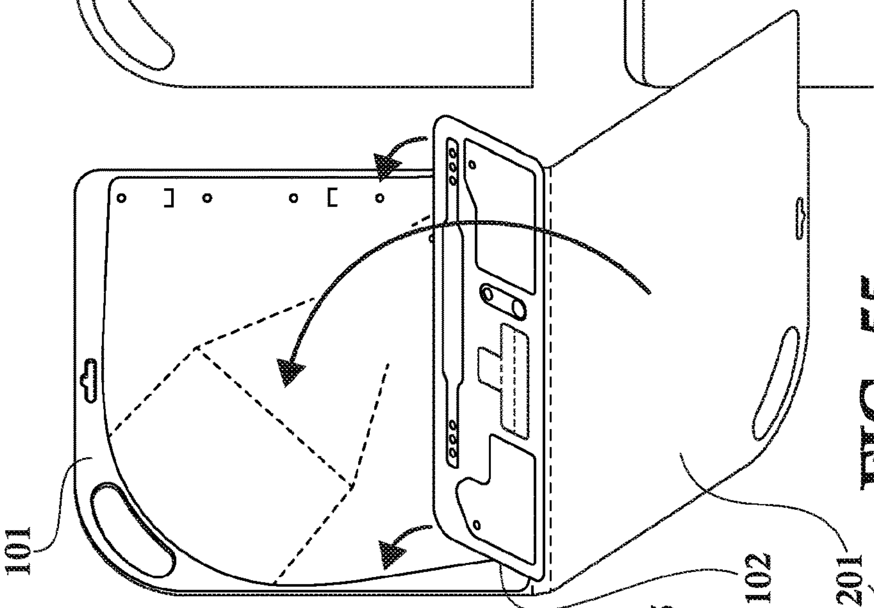

At this point, the second portion 102 of the support 100 is bent at the first portion 101 thanks to said bending bridges 105 (FIG. 55).

Figure 56:
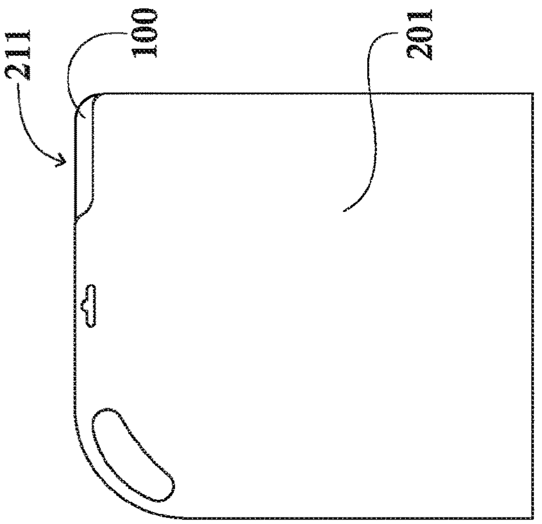
FIGS. 54 to 57 illustrate the views in sequence of the steps of packing the support with the utensil of the invention in the packaging of FIG. 53.
Figure 57:
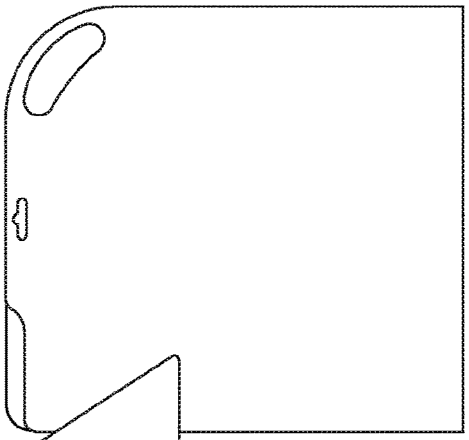

Now the other portion 201 of the packaging can be folded to close the support 100 (FIG. 55). It should be noted that in the closed condition, the window 211 makes it possible to glimpse a piece of the support 100 that can have a certain color so that it is possible to choose the color of the sheet 2 of the utensil (FIGS. 56-57).

The packaging can be closed with conventional closing means (not shown) such as tonguing, Velcro, adhesives present along its perimetric edge. In addition, the weakened segments 203 are distanced so as to form, when the packaging is folded, a sort of pocket to conveniently contain the thickness of the buttons 3. It should also be noted that the creases 203 of the packaging 200 coincide with the edges 103 and 104 respectively of the first 101 and second portion 102 of the support 100, and the hinge element 202 coincides with the separation distance of said edges 103 and 104 allowed by the bending bridges. 105.

Figure 58:
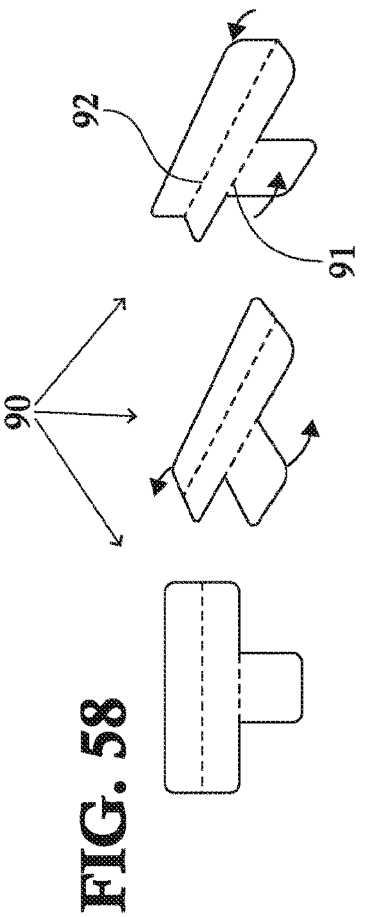
FIGS. 58 to 61 illustrate the steps of assembling an accessory of the packaging of FIG. 53.
Figure 59:
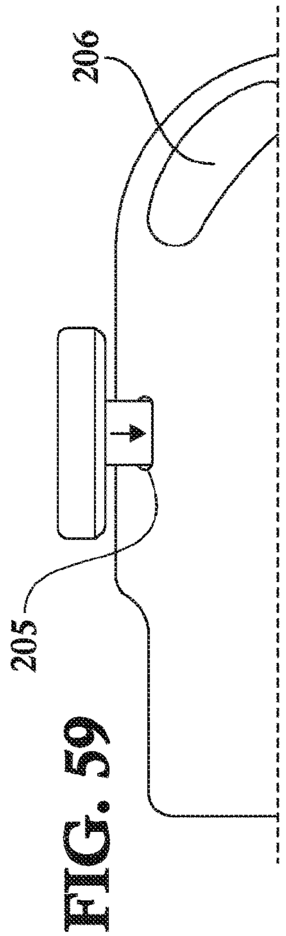
Figure 60:
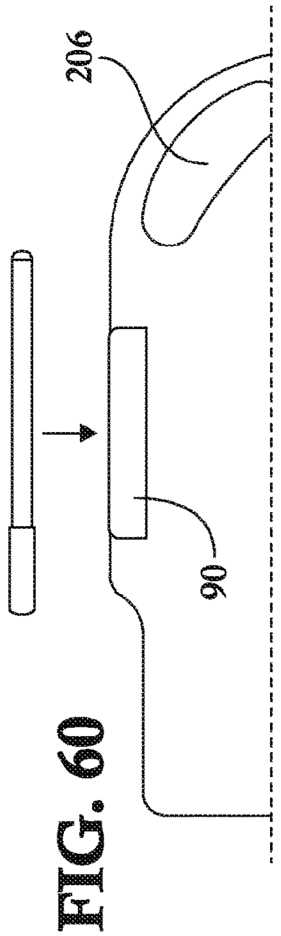
Figure 61:
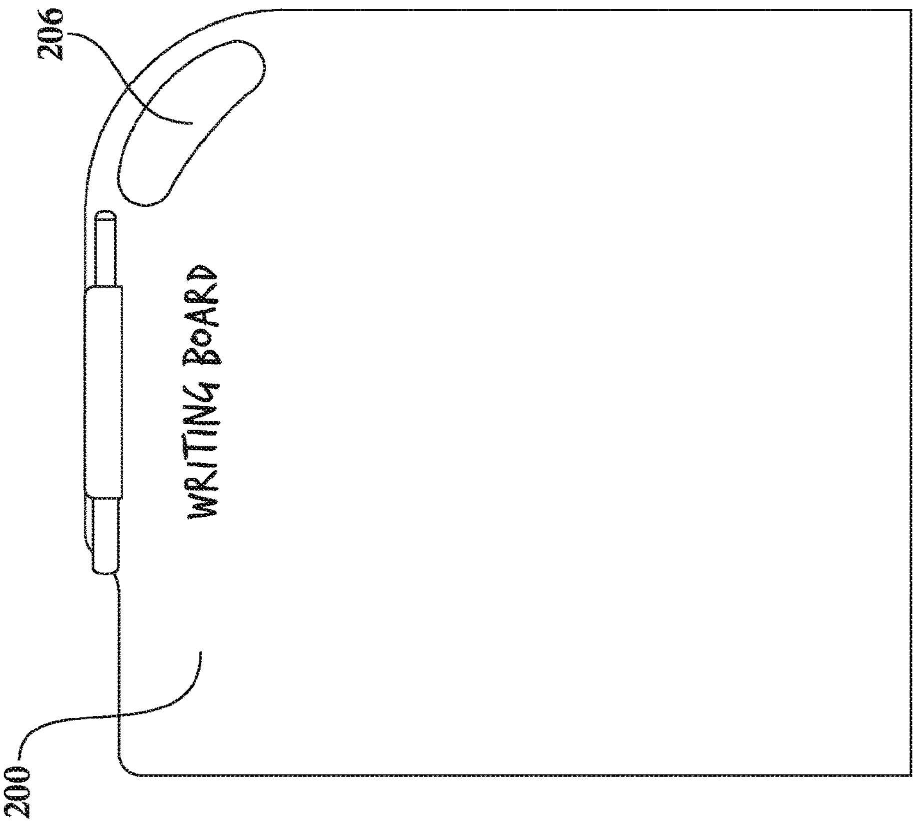

As is shown in FIG. 58, the felt-pen holder 90, once it is separated from the support 100, is bent along said weakened segments 91 and 92, respectively to insert the stem of the T into the first hole 205 of the packaging 200 and to receive a felt pen between the two halves of the head of the "T" (FIGS. 59-60). The specific version with felt pen has been studied with the objective or re-using the packaging; in fact, thanks to an internal plasticization treatment (or with the use of an already prearranged material of the packaging), it is possible, by just overturning the packaging, to use it as a writing board (FIG. 61), weekly planner or calendar, or a combination of the same by using both internal sides of the board. Moreover, or as an alternative, on the internal or external surface of the packaging can be printed various information relative, for example, to the instructions for assembling the utensil, to the uses of the same, or to the material.

Figure 64:
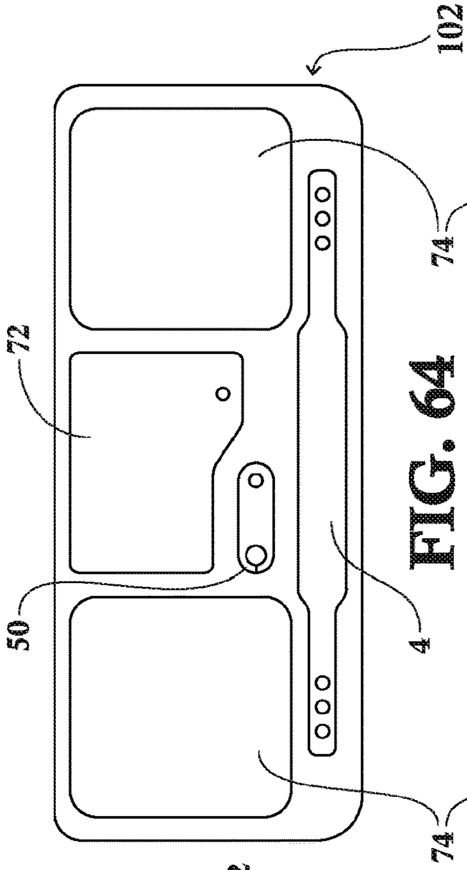
FIGS. 62 to 65 illustrate examples of accessories of the utensil of the invention carried by the support of FIG. 41.
Figure 65:
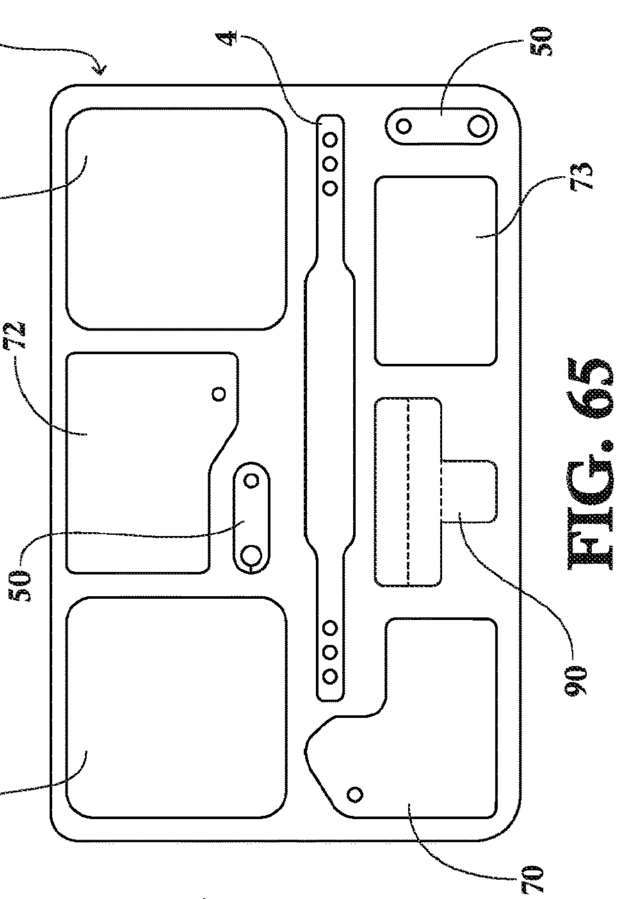
Figure 62:
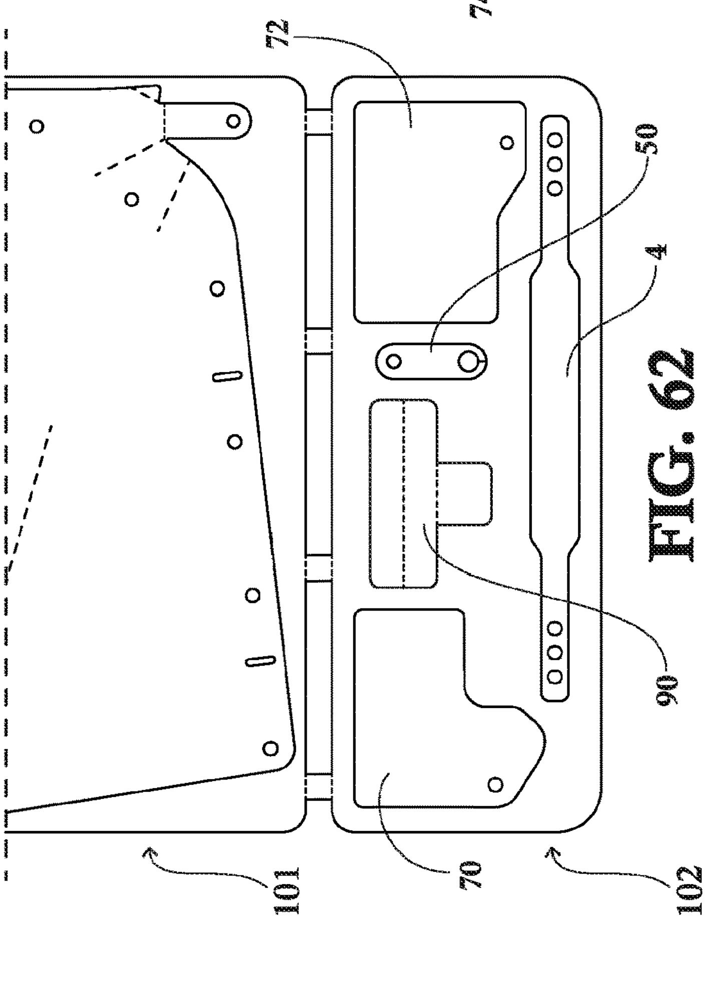
Figure 63:
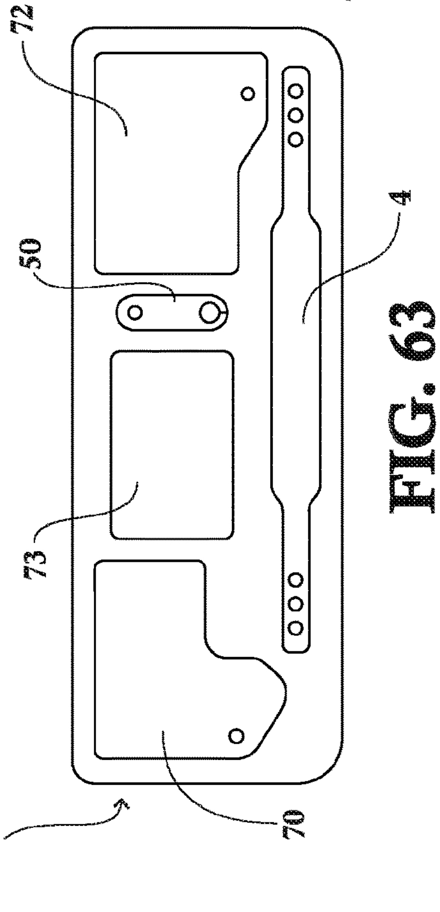

Thanks to the great versatility of the support 100 of the utensil 1 of the invention, among the various accessories described previously, the second portion 102 can be provided with various combinations that include a label 70, a spatula 72, a handle 4, a hook 50 and felt-pen holder 90 (FIG. 62); as an alternative, there can be a combination with a label 70, a spatula 72, a handle 4, a hook 50 and a business card 73 (FIG. 63), or a handle 4, a hook 50, a spatula 72 and two glass coasters 74 (FIG. 64), or again all the accessories previously indicated in a single support 102 (FIG. 65).

It should also be noted that the components of the utensil can be, for example, split between said two portions 101 and 102 of the support 100, or divided in two totally separate portions of the support or contained in a single support not split into separate portions. All these variants can however be adapted to different types of packaging, like for example an envelope, a bag or a box.

From the above description, it is evident that the support and the packaging of the utensil of the invention make it possible to achieve a great versatility of the product to allow considerable simplicity of production, storage, transportation and use, compared to any similar utensil on the market.

All the components (sheet 2; handle 4; hook 50; label 70; spatula 72, as well as the possible accessories like business cards 73; glass coasters 74 and felt-pen holder 90) are now made (with the sole exception of the button-type joining means 3) with the same material, and formed, preferably, from a single sheet, with all the resulting advantages: such as for example, the insertion of a support 100 (using what would have been waste material) and the optimization of the production costs since with a single "stroke" can be obtained all the components of the utensil 1 of the invention.

The specific button-type joining means also make it possible, among the closing of the utensil, to link and make, simply and quickly, any adjustment of all the components.

It is equally evident for a person skilled in the art that the combination of the accessories is not limited to the examples previously indicated but, again by using the principle of the single sheet of material from which to form the utensil, other accessories or compositions of accessories can be obtained.

The creases, or weakened segments (broken lines in the drawings indicated by numbers 28; 28A/B/C; 54; 55; 91; 92; 203 of the packaging, and also the parts connecting the joining means 105 with the edges 103 and 104 of the support 100) have the function of facilitating bending. This result can also be obtained by using incisions, for example shallow cuts, or similar procedures.

Similarly, these variants can be used to facilitate the bending of the portions of the sheet where inclined planes or closures are to be created, as in the above case of the broken lines 28 that advantageously allow the easy and immediate deformation of parts of the cone into flat surfaces that facilitate the collection of material.

The invention claimed is:

1. Utensil comprising a main body in the shape of a hollow cone formed by closing it upon itself along two adjoining edges of a sheet of foldable material, means for reversibly joining said two edges, grasping means for handling said utensil, closing means for reversibly closing the vertex of the main body.

2. Utensil according to claim 1, wherein said sheet has generally a diamond shape in a plan view with four vertexes, a first vertex opposite a second vertex along a larger diameter, a third vertex opposite a fourth vertex along a smaller diameter.

3. Utensil according to claim 2, wherein said four vertexes are rounded, the curve of the third vertex extending further with respect to the curve of the fourth vertex.

4. Utensil according to claim 2, wherein from the fourth vertex extends an appendage that forms the reversible closing means of the vertex of the main body.

5. Utensil according to claim 4, wherein said appendage comprises a hole on its free end adapted to be engaged by a joining means that joins it reversibly to a hole formed on the sheet near said fourth vertex.

6. Utensil according to claim 4, wherein said appendage comprises hook means suitable for suspending the utensil.

7. Utensil according to claim 2, wherein along the two edges of the sheet that branch off from the fourth vertex are provided openings for reversibly engaging said grasping means.

8. Utensil according to claim 7, wherein said grasping means are a handle comprising a flat and elongate portion from the ends of which branch off tabs that engage the openings of said edges.

9. Utensil according to claim 8, wherein said handle comprises at least one hole formed on said tabs to engage with a joining means after being superimposed with a corresponding hole formed on said sheet at its two edges.

10. Utensil according to claim 7, wherein said joining means are buttons having generally a mushroom shape with a disk-like head and a rounded stem for engaging with the holes of said edges.

11. Utensil according to claim 2, wherein along the two edges of the sheet that branch off from the fourth vertex is present a plurality of holes adapted to be reversibly engaged by said joining means.

12. Utensil according to claim 2, comprising two first creases that extend from said third vertex toward said fourth vertex and a second crease transversal between said two first creases so as to mark a first portion and a second portion of said sheet that can be deformed in two planes that are inclined with respect to each other.

13. Utensil according to claim 2, also comprising a label connected removably to said second vertex of the sheet so as to rotate on the plane of the sheet itself so as to almost completely overlap the same.

14. Utensil according to claim 1, also comprising a partial lining of the sheet, said lining being provided with at least one edge anchored to a surface of the sheet and a gripping tab to rotate the lining from a side of the internal wall opposite to the at least one edge superimposed toward said at least one edge to cover the line of superimposition of the at least one edge.

15. Utensil according to claim 1, comprising a funnel or a glove that fits inside it, the funnel being provided with an annular edge that folds over the first widened end and a narrow drain tube at its tapered second end.

16. Utensil according to claim 1, wherein said sheet comprises a flat bottom and a wall that extends from said bottom as a vault, the bottom has a general shape as a circular sector with an arcuate free edge that protrudes with respect to the wall, consisting of two flaps folded and joined on the respective edges of the sheet.

17. Utensil according to claim 1, comprising a brush or a collecting spatula.

18. Utensil according to claim 17, wherein said collecting spatula consists of a piece of semi-rigid, plastic and/or elastic, and/or spongy material such as polyurethane and foam rubber, which can also be provided with a cut that makes it possible to fix it removably to the sheet.

* * * * *